(12) United States Patent
Ko et al.

(10) Patent No.: US 11,794,207 B2
(45) Date of Patent: Oct. 24, 2023

(54) SYSTEMS AND METHODS FOR APPLYING MATERIALS TO MEDICAL DEVICES

(71) Applicant: ECOM Medical, Inc., San Juan Capistrano, CA (US)

(72) Inventors: Michael J. Ko, Mission Viejo, CA (US); Guy Russell Lowery, San Juan Capistrano, CA (US)

(73) Assignee: ECOM Medical, Inc., San Juan Capistrano, CA (US)

( * ) Notice: Subject to any disclaimer, the term of this patent is extended or adjusted under 35 U.S.C. 154(b) by 0 days.

(21) Appl. No.: 17/859,497

(22) Filed: Jul. 7, 2022

(65) Prior Publication Data

US 2022/0339664 A1    Oct. 27, 2022

Related U.S. Application Data

(62) Division of application No. 16/640,338, filed as application No. PCT/US2018/047152 on Aug. 21, 2018, now Pat. No. 11,465,171.

(Continued)

(51) Int. Cl.
*B05D 1/00* (2006.01)
*B05C 5/02* (2006.01)
(Continued)

(52) U.S. Cl.
CPC .......... *B05D 1/002* (2013.01); *B05B 13/0207* (2013.01); *B05B 13/0235* (2013.01);
(Continued)

(58) Field of Classification Search
CPC ....... B05D 1/002; B05D 1/26; B05D 2254/02
See application file for complete search history.

(56) References Cited

U.S. PATENT DOCUMENTS

| 4,075,975 A | 2/1978 | Oswald |
| 4,942,629 A | 7/1990 | Stadlmann |

(Continued)

FOREIGN PATENT DOCUMENTS

| CN | 101616644 A | 12/2009 |
| CN | 201532506 U | 7/2010 |

(Continued)

OTHER PUBLICATIONS

PCT International Search Report and Written Opinion for PCT/US2018/047152, ECOM Medical, Inc., Forms PCT/ISA/220, 210, and 237 dated Jan. 2, 2019 (26 pages).

(Continued)

*Primary Examiner* — Nathan T Leong
(74) *Attorney, Agent, or Firm* — BLAIR WALKER IP SERVICES, LLC

(57) ABSTRACT

A method for applying a predetermined pattern of material onto an elongate tubular substrate includes securing a first portion of an elongate tube having a non-circular outer perimeter to an engagement member configured to be rotated by a first motor, such that the elongate tube can be rotated in unison with the engagement member, operating the first motor to rotate the elongate tube, operating a second motor of to change the relative displacement between the elongate tube and a dispensing conduit along a longitudinal axis of the elongate tube, and expelling a conductive adhesive from a fluid dispenser through the dispensing conduit to form a predetermined pattern of the conductive adhesive on a surface of the elongate tube, the predetermined pattern of the conductive adhesive covering at least 180 degrees of the surface along the non-circular outer perimeter over a width of at least two millimeters along the longitudinal axis.

20 Claims, 20 Drawing Sheets

Related U.S. Application Data

(60) Provisional application No. 62/548,129, filed on Aug. 21, 2017.

(51) Int. Cl.
  *B05C 13/02* (2006.01)
  *B05D 1/26* (2006.01)
  *B05B 13/02* (2006.01)
  *B05B 13/06* (2006.01)

(52) U.S. Cl.
  CPC .......... *B05B 13/0645* (2013.01); *B05C 5/022* (2013.01); *B05C 5/027* (2013.01); *B05C 5/0241* (2013.01); *B05C 5/0254* (2013.01); *B05C 13/025* (2013.01); *B05D 1/26* (2013.01); *B05D 2254/02* (2013.01)

(56) References Cited

U.S. PATENT DOCUMENTS

| | | |
|---|---|---|
| 5,319,397 A | 6/1994 | Ryden |
| 5,363,153 A | 11/1994 | Bailiff |
| 5,379,765 A | 1/1995 | Kajiwara et al. |
| 5,947,581 A | 9/1999 | Schrimmer et al. |
| 7,108,576 B2 | 9/2006 | LaPointe |
| 7,410,254 B2 | 8/2008 | Goodis |
| 7,648,234 B2 | 1/2010 | Welchel et al. |
| 8,226,228 B2 | 7/2012 | Shantha et al. |
| 8,371,241 B2 | 2/2013 | Sedberry et al. |
| 9,037,226 B2 | 5/2015 | Hacker et al. |
| 9,072,622 B2 | 7/2015 | Kindaichi et al. |
| 9,289,141 B2 | 3/2016 | Lowery et al. |
| 9,486,145 B2 | 11/2016 | Feer et al. |
| 2005/0158449 A1 | 7/2005 | Chappa |
| 2007/0123140 A1 | 5/2007 | Bonsembiante |
| 2007/0297174 A1 | 12/2007 | Girolami |
| 2009/0181160 A1 | 7/2009 | Pacetti |
| 2010/0055294 A1 | 3/2010 | Wang et al. |
| 2011/0151199 A1 | 6/2011 | Nelson et al. |
| 2012/0130363 A1 | 5/2012 | Kim et al. |
| 2012/0215074 A1 | 8/2012 | Krimsky |
| 2012/0315374 A1 | 12/2012 | Nguyen et al. |
| 2012/0315376 A1 | 12/2012 | Nguyen et al. |
| 2014/0243821 A1 | 8/2014 | Salahieh et al. |
| 2015/0054221 A1 | 2/2015 | Sandman et al. |
| 2016/0310708 A1* | 10/2016 | Gotou ............... A61M 25/1029 |
| 2017/0066925 A1 | 3/2017 | Liang |

FOREIGN PATENT DOCUMENTS

| | | |
|---|---|---|
| CN | 101818237 A | 9/2010 |
| CN | 204183234 U | 3/2015 |
| EP | 3064247 A1 | 9/2016 |
| EP | 3106197 A1 | 12/2016 |
| JP | H08243475 A | 9/1996 |
| TW | M529593 U | 10/2016 |
| WO | WO2010024898 A2 | 3/2010 |
| WO | WO2010024898 A3 | 3/2010 |
| WO | WO2016179563 A1 | 11/2016 |

OTHER PUBLICATIONS

Extended European Search Report dated Jul. 3, 2020, in EP App. No. 18848012.3 filed Aug. 21, 2018 (7 pages).
Machine translation Abstract of CN101818237A (2 pages).
Translation of abstract of JPH08243475A (10 pages).

* cited by examiner

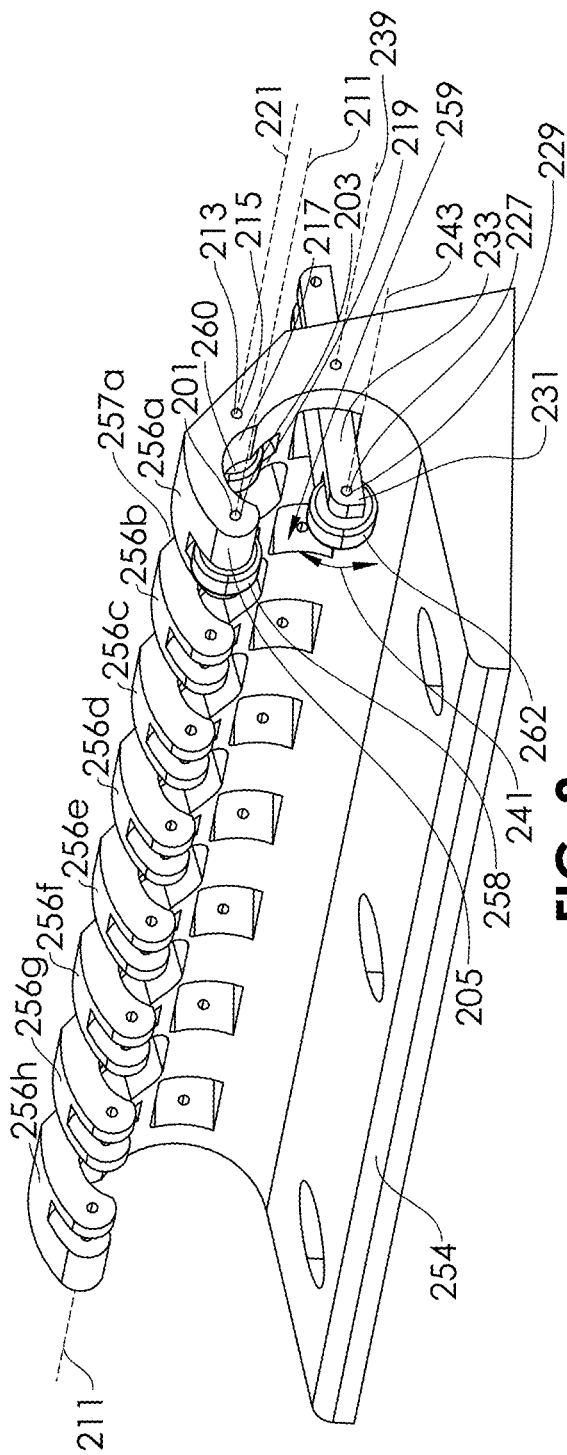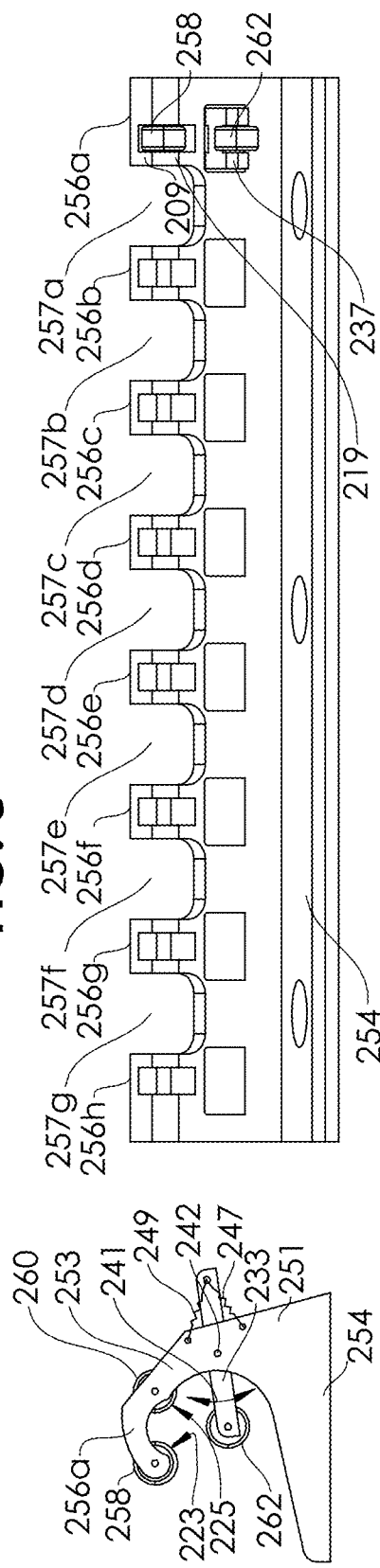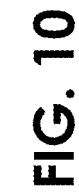

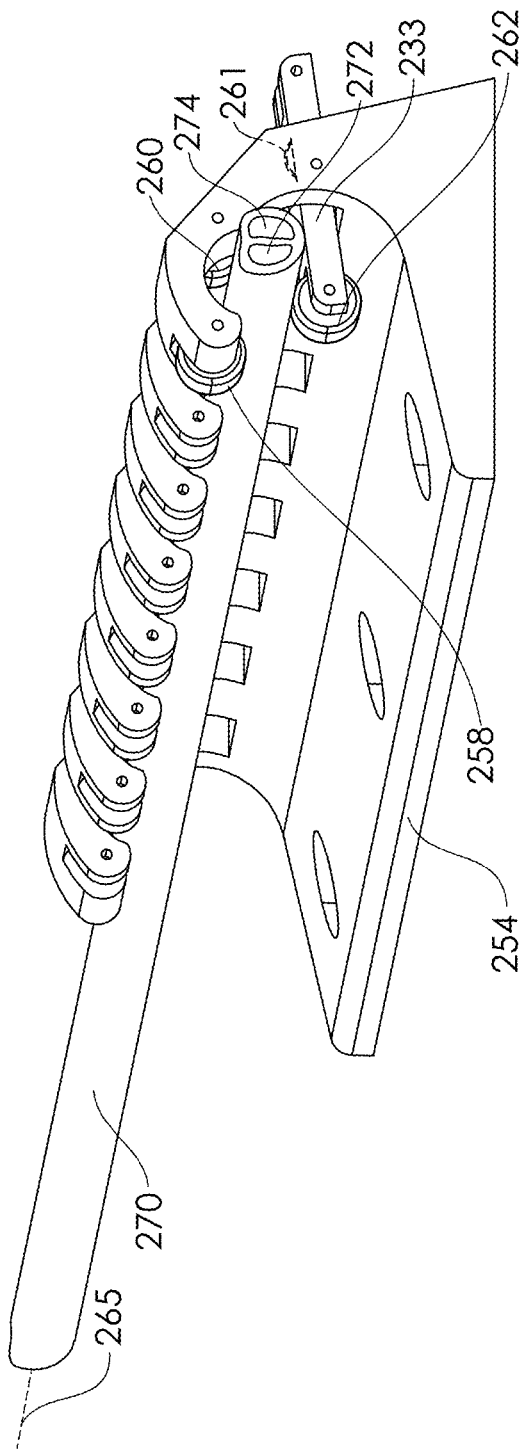
FIG. 11
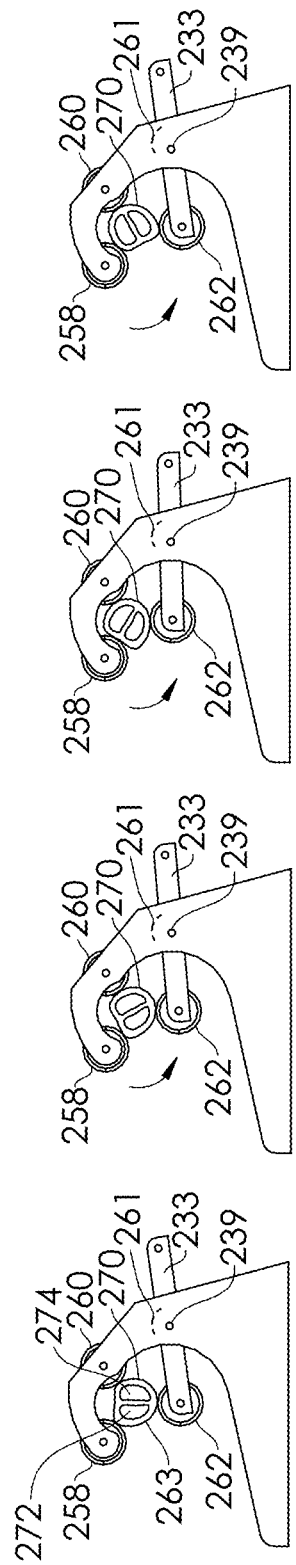
FIG. 12
FIG. 13
FIG. 14
FIG. 15

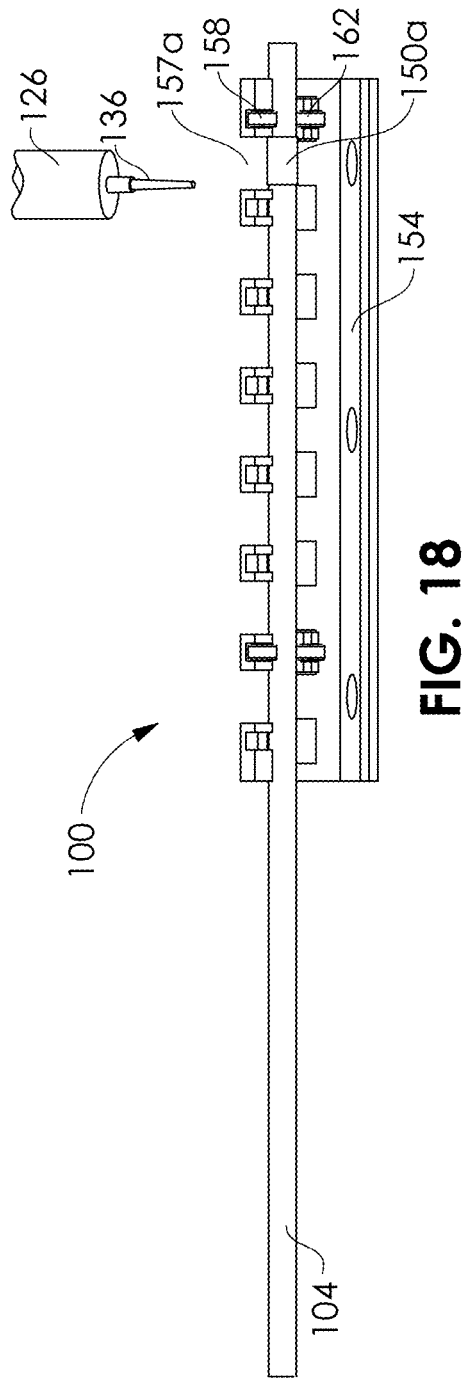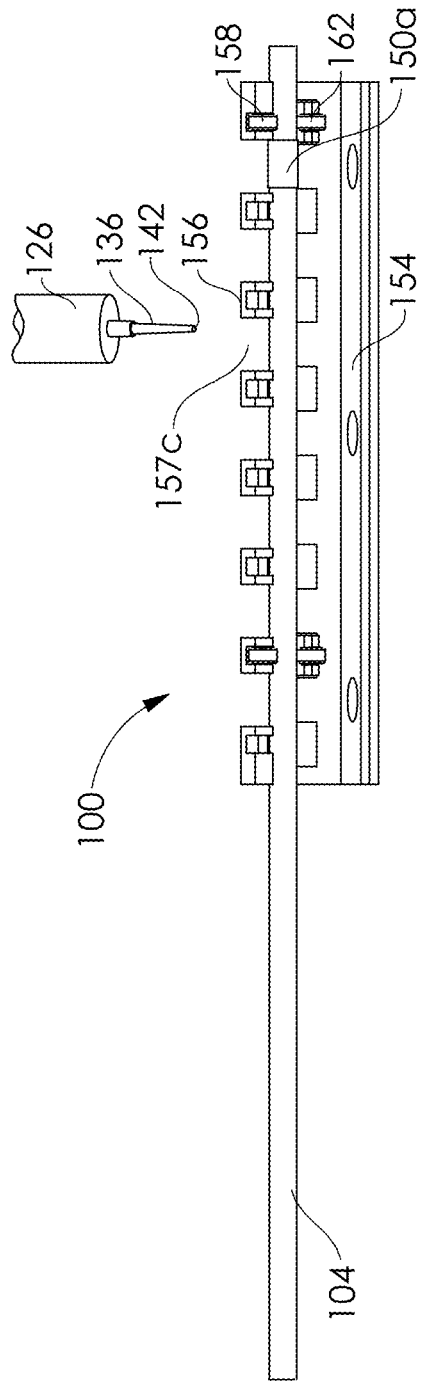

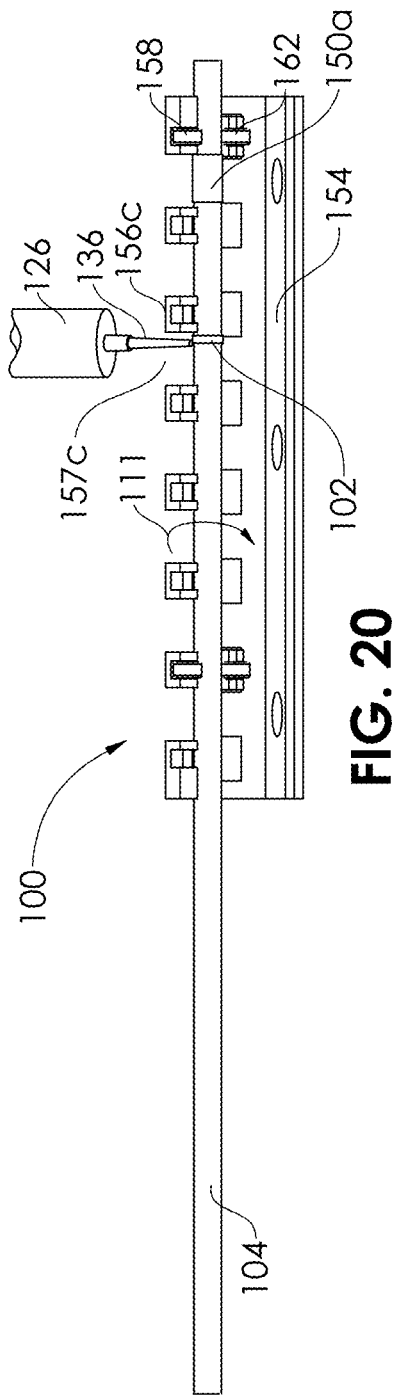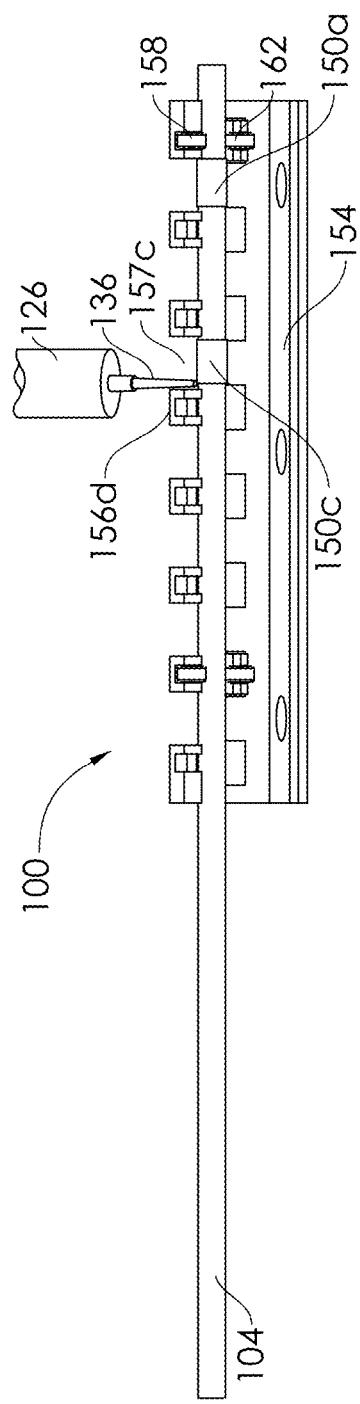

SYSTEMS AND METHODS FOR APPLYING MATERIALS TO MEDICAL DEVICES

INCORPORATION BY REFERENCE TO ANY PRIORITY APPLICATIONS

This application is a division of U.S. patent application Ser. No. 16/640,338, filed on Feb. 19, 2020, now U.S. Pat. No. 11,465,171, which is a U.S. National Stage patent application for PCT application no. PCT/US2018/047152, filed on Aug. 21, 2018, which claims the benefit of priority to U.S. Provisional Application No. 62/548,129, filed on Aug. 21, 2017, all of which are incorporated by reference in their entirety herein for all purposes. Priority is claimed pursuant to 35 U.S.C. § 120 and 35 U.S.C. § 119.

FIELD OF THE INVENTION

The field of the invention generally relates to systems for performing diagnostic or therapeutic procedures within a cavity of a living body.

BACKGROUND

To add functionality to medical devices made of flexible plastic materials a process was developed to print an electrically conductive flexible electronic circuit on inflatable cuffs, balloons, sleeves or membranes. Some representative embodiments include, but are not limited to, endotracheal tubes, nasogastric tubes. Difficulties occur when using this process on tubing having an outer perimeter that is non-circular or on features that have a certain degree of complexity.

SUMMARY OF THE INVENTION

In one embodiment of the present disclosure, a mechanism for applying a predetermined pattern of material onto an elongate tubular substrate includes a first motor, an engagement member rotatable by the first motor and configured to reversibly grasp an elongate member having a longitudinal axis, such that rotation of the first motor rotates the elongate member around its longitudinal axis, a fluid dispenser configured to dispense a fluid having a first, flowable state, the fluid dispenser including an elongate dispensing conduit having a distal end having an orifice, the orifice configured to be placed adjacent a surface of the elongate member, a second motor configured to move at least one of the elongate member or the elongate dispensing conduit such that the orifice changes its relative orientation along the longitudinal axis of the elongate member, and wherein the distal end of the elongate dispensing conduit is configured to apply a bias on the surface of the elongate member.

In another embodiment of the present disclosure, a mechanism for applying a predetermined pattern of material onto an elongate tubular substrate includes a first motor, an engagement member rotatable by the first motor and configured to reversibly hold an elongate member having a longitudinal axis, such that rotation of the first motor rotates the elongate member around its longitudinal axis, a fluid dispenser configured to dispense a fluid having a first, flowable state, the fluid dispenser including an elongate dispensing conduit having a distal end having an orifice, the orifice configured to be placed adjacent a surface of the elongate member, a second motor configured to move at least one of the elongate member or the elongate dispensing conduit such that the orifice changes its relative orientation along the longitudinal axis of the elongate member, and a variable bearing spaced a first distance from the engagement member and including first, second and third rollers, each of the first, second, and third rollers configured to simultaneously contact the surface of the elongate member over a complete rotation of the elongate member.

In yet another embodiment of the present disclosure, a toy having a hollow or tubular structure includes a first surface, one or more electroluminescent elements disposed on the first surface, and a circuit configured for operating the one or more electroluminescent elements.

In still another embodiment of the present disclosure, an antifogging eyewear includes a frame, one or more lenses coupled to the frame, and one or more heating elements carried on at least one of the frame or the one or more lenses.

In still another embodiment of the present disclosure, a drinking glass includes a receptacle body having an inner surface and an outer surface, and one or more heating elements carried on at least one of the inner surface or the outer surface.

In yet another embodiment of the present disclosure, method for applying a predetermined pattern of material onto an elongate tubular substrate includes securing a first portion of an elongate tube having a non-circular outer perimeter to an engagement member configured to be rotated by a first motor, such that the elongate tube can be rotated in unison with the engagement member, operating the first motor to rotate the elongate tube, operating a second motor of to change the relative displacement between the elongate tube and a dispensing conduit along a longitudinal axis of the elongate tube, and expelling a conductive adhesive from a fluid dispenser through the dispensing conduit to form a predetermined pattern of the conductive adhesive on a surface of the elongate tube, the predetermined pattern of the conductive adhesive covering at least 180 degrees of the surface along the non-circular outer perimeter over a width of at least two millimeters along the longitudinal axis.

In still another embodiment of the present disclosure, a medical device includes a polymeric tube having an outer cylindrical surface, a lumen, a wall, a first hole in the wall and a second hole in the wall, a conductor extending at least partially through the lumen of the tube, the conductor exiting the first hole and entering the second hole, a first conductive adhesive layer securing the conductor to the outer cylindrical surface of the tube at a portion between the first hole and the second hole, and a second conductive adhesive layer covering the conductor and the first conductive adhesive layer at the portion between the first hole and the second hole.

BRIEF DESCRIPTION OF THE DRAWINGS

FIG. 8 is a perspective view of a fixture having a dynamic roller bearing, according to an embodiment of the present disclosure.

FIG. 9 is a side view of the fixture of FIG. 8.

FIG. 10 is a front view of the fixture of FIG. 8.

FIG. 11 is a perspective view of a machine for applying an adhesive to an elongate component in use, according to an embodiment of the present disclosure.

FIG. 12 is a side view of the machine of FIG. 11 in use in a first condition.

FIG. 13 is a side view of the machine of FIG. 11 in use in a second condition.

FIG. 14 is a side view of the machine of FIG. 11 in use in a third condition.

FIG. 15 is a side view of the machine of FIG. 11 in use in a fourth condition.

FIG. 18 front view of the machine of FIG. 11 at a third stage of operation.

FIG. 19 front view of the machine of FIG. 11 at a fourth stage of operation.

FIG. 20 front view of the machine of FIG. 11 at a fifth stage of operation.

FIG. 21 front view of the machine of FIG. 11 at a sixth stage of operation.

DETAILED DESCRIPTION OF THE ILLUSTRATED EMBODIMENTS

Embodiments of the invention include machines and methods for producing medical devices, medical device components or other non-medical devices or components having predetermined patterns of material applied on elongate tubes or shafts, or contoured surfaces, and methods for using these machines.

Several types of medical devices utilize conductive traces carried by polymeric bodies, shafts, tubing, or balloons. Examples of bioelectrical impedance analysis of blood flow using electrode sensors arrayed within body lumens, at least some of the sensors contacting mucosal tissue can be found in U.S. Pat. No. 5,791,349, issued on Aug. 11, 1998, and entitled "APPARATUS AND METHOD OF BIOELECTRICAL IMPEDANCE ANALYSIS OF BLOOD FLOW," U.S. Pat. No. 5,782,774, issued on Jul. 21, 1998, and entitled "APPARATUS AND METHOD OF BIOELECTRICAL IMPEDANCE ANALYSIS OF BLOOD FLOW," U.S. Pat. No. 6,095,987, issued on Aug. 1, 2000, and entitled "APPARATUS AND METHODS OF BIOELECTRICAL IMPEDANCE ANALYSIS OF BLOOD FLOW," and U.S. Pat. No. 6,292,689, issued on Sep. 18, 2001, and entitled "APPARATUS AND METHODS OF BIOELECTRICAL IMPEDANCE ANALYSIS OF BLOOD FLOW," all of which are hereby incorporated by reference in their entirety for all purposes.

Devices having sensors and conductive traces may also be utilized to obtain an electrocardiogram signal from the body of the patient to provide electrical timing information, as described in international publication number WO2016/179563, published on Nov. 10, 2016, and entitled "SYSTEMS AND METHODS FOR INTERNAL ECG ACQUISITION," and co-owned U.S. patent application Ser. No. 15/571,350, filed Nov. 2, 2017, and entitled "SYSTEMS AND METHODS FOR INTERNAL ECG ACQUISITION," both of which are hereby incorporated by reference in their entirety for all purposes.

Figure 1:
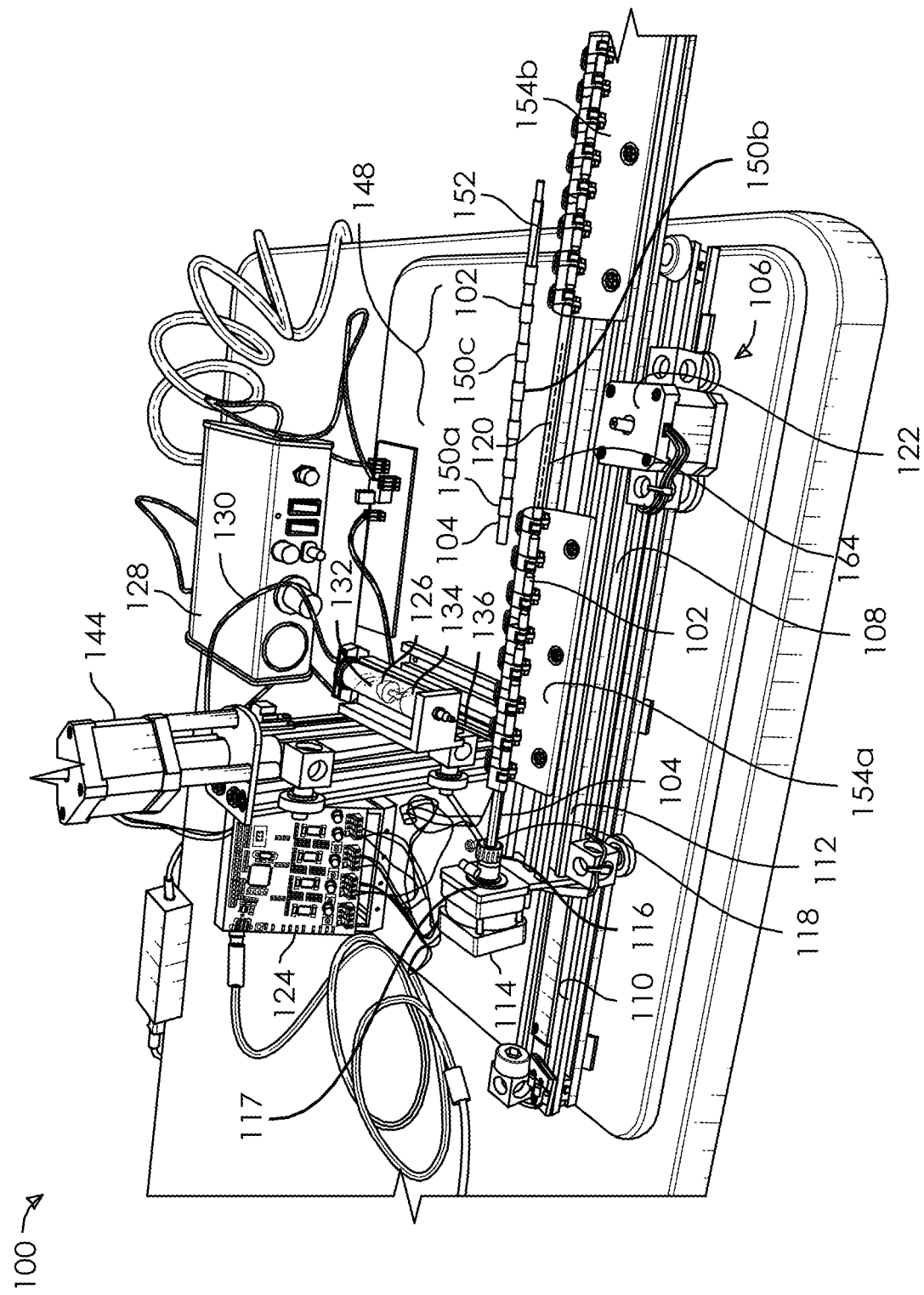
FIG. 1 is a perspective view of a machine for applying an adhesive to an elongate component, according to an embodiment of the present disclosure.
Figure 2:
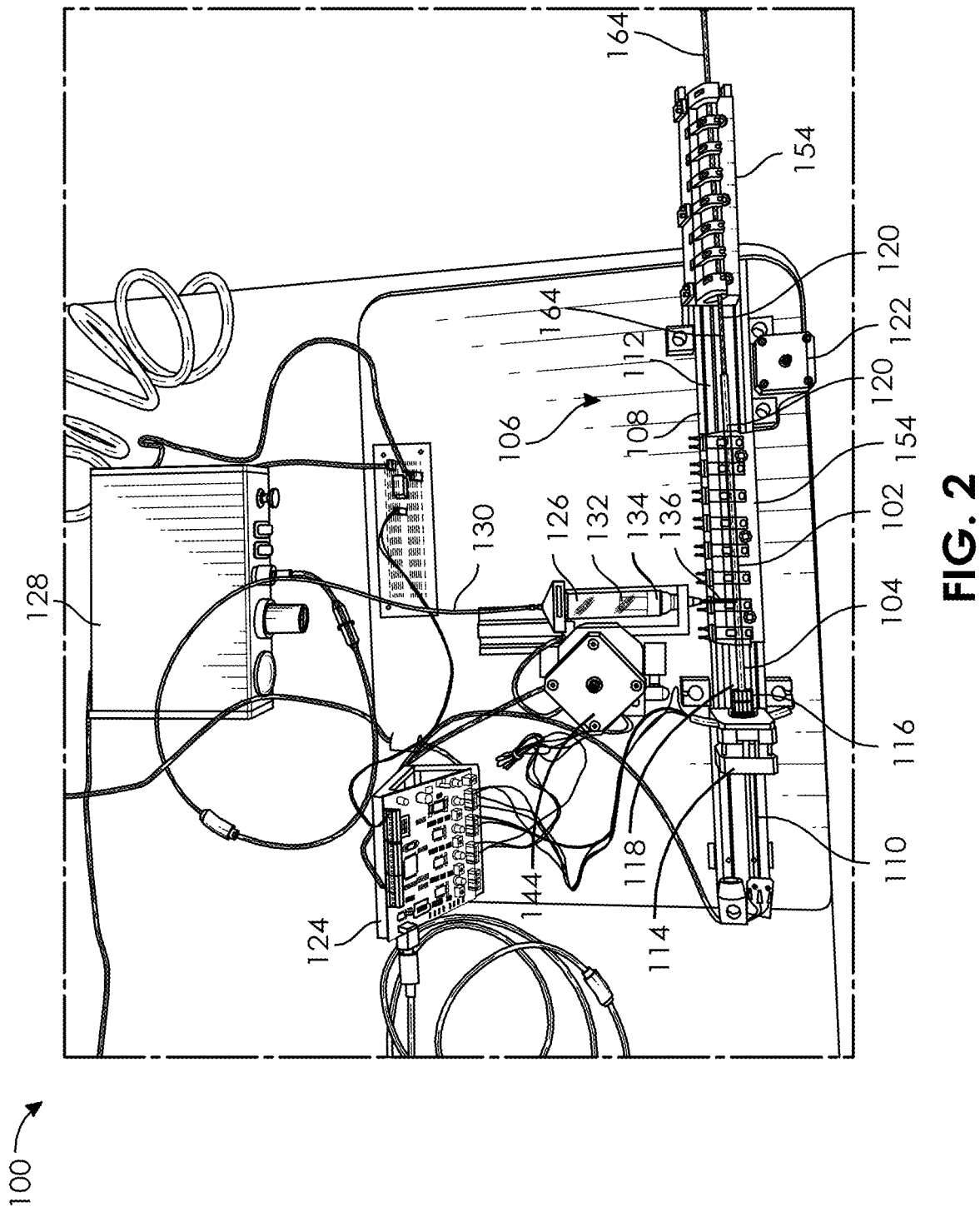
FIG. 2 is a top view of the machine of FIG. 1.

Difficulties occur when applying sensors, conductive traces or other patterns on tubing having an outer perimeter that is non-circular or on features that have a certain degree of complexity or are non-planar. FIGS. 1 and 2 illustrate a machine 100 configured to apply conductive adhesive 102 to an elongate substrate 104, or a medical device shaft (tubing), including a catheter tube or probe body. The machine 100 comprises a base 106 which includes a longitudinal slide 108 having a stationary bottom portion 110 secured to the base 106 and a displaceable top portion 112 which is slidable with respect to the stationary bottom portion 110. Attached to and moveable with the top portion 112 is a motor 114. The motor 114 is rotationally coupled to a locking member 116 (or engagement member) which is configured to be securable and releasable from an end portion 118 of the medical device shaft 104. The locking member 116 may comprise a chuck or a cinch or a compression lock (similar to a Touhy-Borst seal) which can be tightened or loosened (or locked and unlocked) by a user around the medical device shaft 104. Alternatively, the locking member 106 may include a magnet, and may be configured to be secured to a ferrous material (e.g., a stainless steel mandrel) that is placed within a lumen of the medical device shaft 104. When the locking member 116 is locked or secured to the medical device shaft 104, rotation of the locking member 116 causes one-to-one rotation of the medical device shaft 104. Thus, operation of the motor 114 causes the medical device shaft 104 to be rotated via the locking member 116. One or more gears 117 may be placed between the motor 114 and the locking member 116 to either speed up or slow down the rotation of the clocking member in relation to the motor 114 rotation, and/or to change the direction of rotation. Thus, the locking member 116 and medical device shaft 104 may be caused to rotate in the same direction as a rotor or shaft of the motor 114, or in an opposite direction than the rotor or shaft of the motor. Additionally, the locking member 116 and medical device shaft 104 may be caused to rotate the same rotational speed as a rotor or shaft of the motor 114, or a different rotational speed than the rotor or shaft of the motor (less than or greater to). It is the object herein for the machine 100 to accommodate not only shaft or tubing 104 that has a circular outer perimeter (i.e., as viewed upon cross-section), but also shaft or tubing 104 that has a non-circular outer perimeter, including, but not limited to D-shaped, elliptically-shaped, ovoid-shaped, or oval-shaped outer perimeters. The locking member 116 is configured to be securable to (and releaseable from) circular or non-circular tubing 104 such that upon being locked to the tubing 104, the motor 114 may be operated to rotate the locking member 116, thus rotating the tubing 104 around its longitudinal axis 120.

Figure 6:
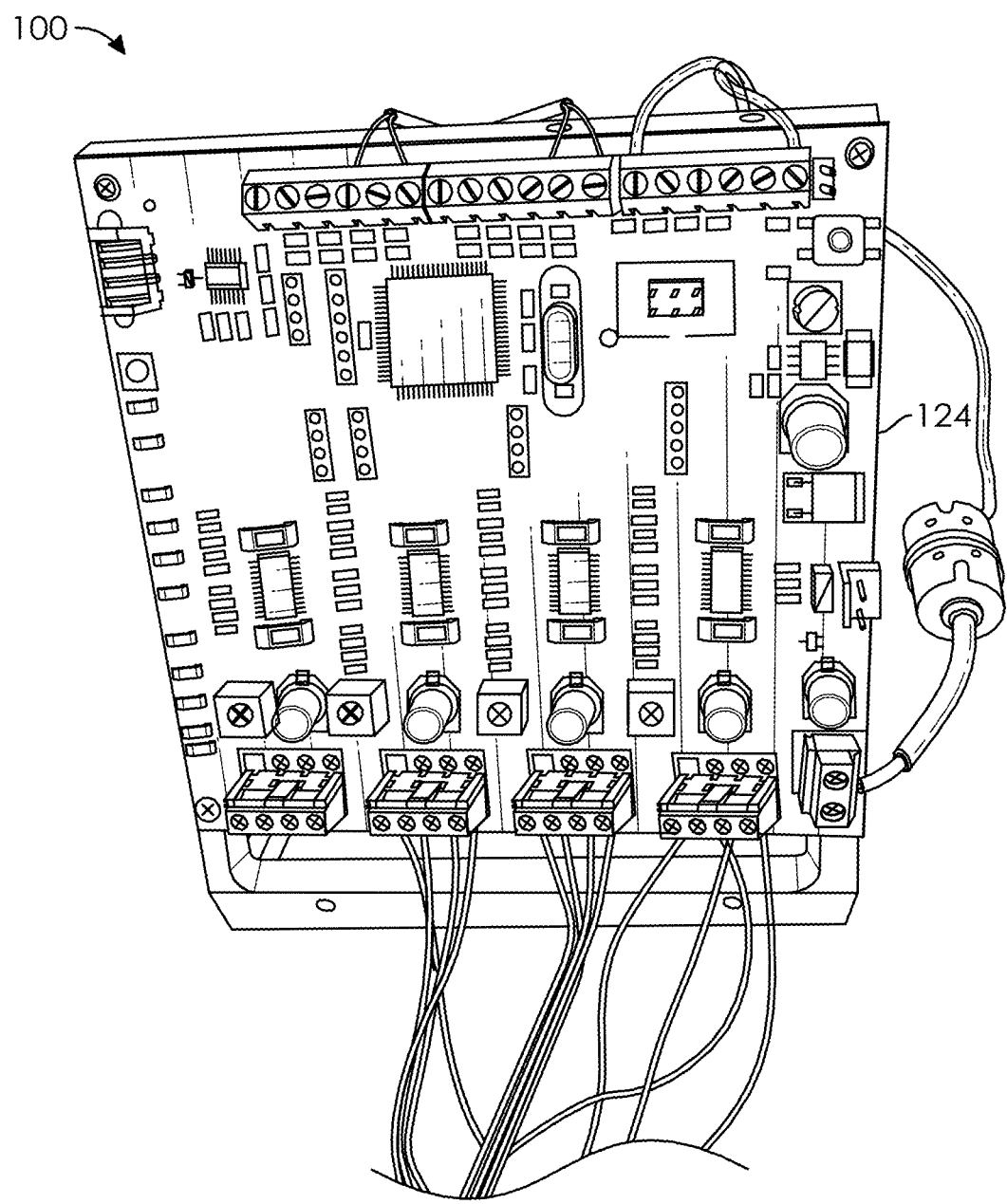
FIG. 6. Is a plan view of a controller, according to an embodiment of the present disclosure.

A motor 122 is configured to longitudinally move the top portion 112 of the longitudinal slide 108 in relation to the bottom portion 110, in either longitudinal direction (parallel to the longitudinal axis 120 of the tubing 104, as shown in FIG. 1). A controller 124 is configured to control the operation of the motors 114, 122, such that any combination of rotation and longitudinal motion of the tubing 104 may be achieved. A number of controllers 124 known in the art may be used, for example the TinyG™, USB-based CNC 6-axis controller sold by Synthetos, LLC of Brookeville, Md., USA, shown in more detail in FIG. 6.

Figure 5:
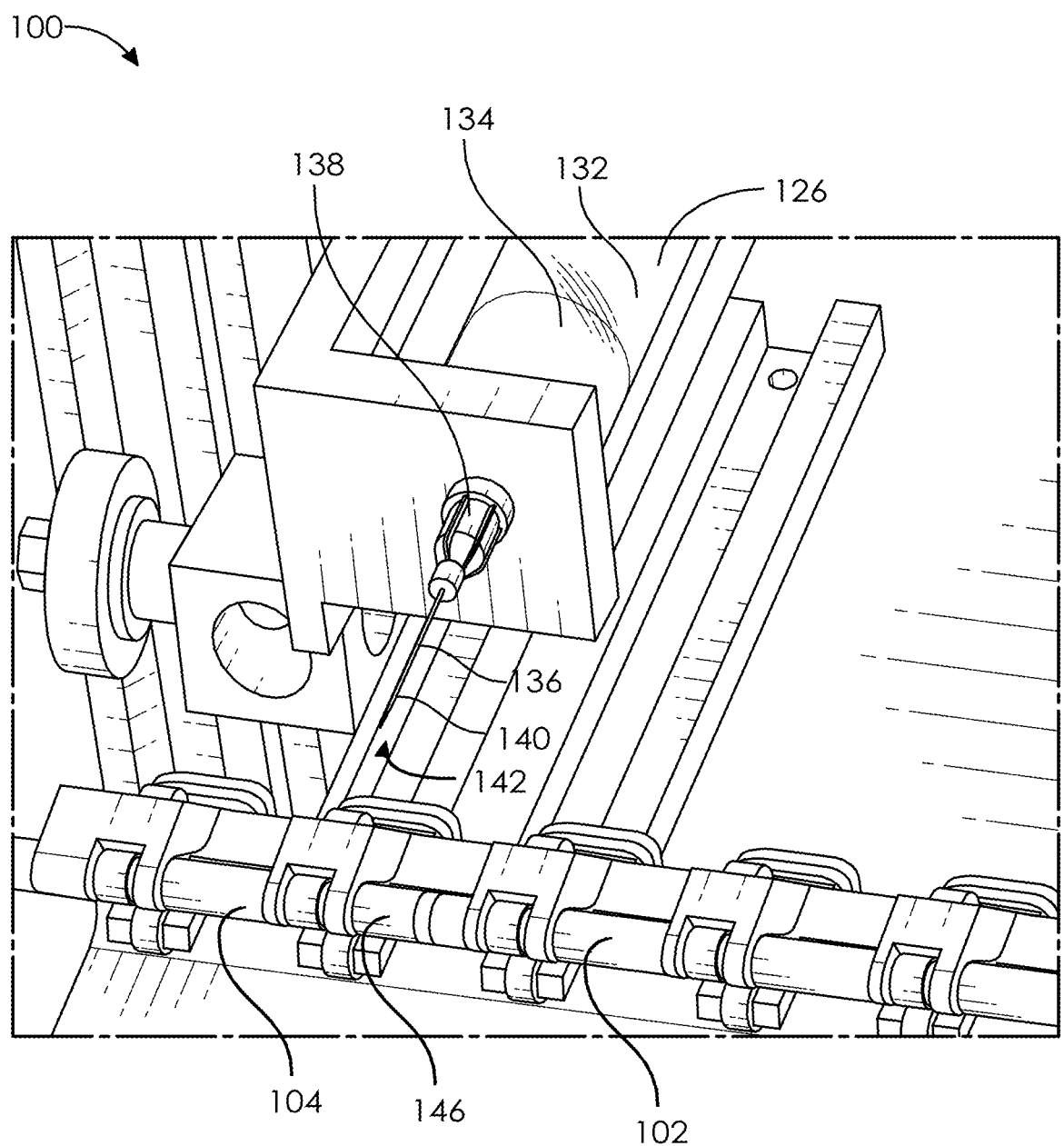
FIG. 5 is a detail view of an adhesive dispenser and needle of the machine of FIG. 1, according to an embodiment of the present disclosure.

The machine 100 includes a syringe 126, which may comprise a plunger/barrel syringe or may be an internal pressure actuated syringe. The syringe 126 in FIGS. 1-2 is attached to a pressurized injection system 128 via a gas line 130 connected therebetween. The pressurized injection system 128 may use a number of gases, including air, filtered air, nitrogen, or carbon dioxide. The internal pressure delivered to the interior of the barrel 132 of the syringe 126 during injection may be between about four pounds per square inch (0.27 atm.) and about twelve pounds per square inch (0.82 atm.), or between about six pounds per square inch (0.41 atm.) and about eight pounds per square inch (0.54 atm.), but the pressure utilized also may depend on the inner diameter and length of a hollow (hypodermic) needle 136 being used with the syringe 126. The barrel 132 of the syringe 126 is filled with an electrically-conductive adhesive 134, and the syringe 126/pressurized injection system 128 are configured to inject the electrically-conductive adhesive 134 out through the needle 136 or other tube (metal, plastic, etc.). Turning to FIG. 5, the needle 136 includes a proximal hub 138 which is fluidly coupled to the barrel 132 of the syringe 126. The needle 136 also includes a distal portion 140 having an orifice 142 through which the injected electrically-conductive adhesive 134 exits upon pressurization. In some embodiments, the syringe 126 may be manually adjustable in relative position in relation to the top portion 112 of the longitudinal slide 108 (e.g., along x, y, and z axes). The syringe 126 may also be rotatable, for example, if a curved or generally non-straight needle 136 is utilized. In other embodiments, at least one motor 144, for example, one, two, three, or four motors, may be used to automatically adjust the location and/or angular orientation of the syringe 126, and more particularly, to adjust the location and orientation of the orifice 142 of the needle 136 in relation to the tubing 104. As will be described further herein, multiple means are described to maintain the orifice 142 in close relationship with the surface 146 of tubing 104 having a non-circular outer perimeter while the tubing 104 is rotated by the motor 114. These means may also be configured to maintain the orifice 142 in close relationship with the surface 146 of tubing 104. For example, if the tubing 104 has a tapering outer transverse dimension or diameter that thus causes a change in the diameter of the adjacent portion of the tubing 104 as the tubing 104 is longitudinally displaced by the motor 122.

Once the orifice 142 is brought into proximity to the surface 146 of the tubing 104 to be covered or coated with the electrically-conductive adhesive 134, a pre-programmed series of rotations of the tubing 104 (via the motor 114) and longitudinal motions of the tubing 104 (via the motor 122) are performed (e.g., by the controller 124) while the pressurized injection system 128 is given the command to inject the electrically-conductive adhesive 134 (manually, or via commands from the controller 124) in order to create a particular pattern of the electrically-conductive adhesive 134 applied onto the surface 146 of the tubing 104. A separate tubing 104 after application of a pattern 148 of the adhesive 134 is shown in FIG. 1 supported next to the longitudinal slide 108 on top of the base 106. (The pattern 148 may include conductive bands 150a-c, or a longitudinal tracing 152, which may be used to electrically connect one or more of the conductive bands 150a-c to electrical conductors (copper wire, etc.) (not shown), using solder or other joining methods. After the application of the bands 150a-c and longitudinal tracings 152, it may be desired to apply a dielectric material over the longitudinal tracings 152, and even over a portion of the bands 150a-c, or over the solder joints. The dielectric material may be placed into a syringe similar to the syringe 126 and applied by the machine 100 in a similar manner to the electrically-conductive adhesive 134. A secondary curing or solidifying process may also be used to accelerate, optimize, or simply complete the change of either the electrically-conductive adhesive 134 or the dielectric material, once applied, from liquid or flowable form to a more solid or cured form. The secondary operation may be performed by a transforming module (not shown) coupled to the machine 100, or used in conjunction with the machine 100. In some embodiments, temperature (e.g., elevated) may be used, using heaters such as hot air, infra-red heating, halogen lamps, radiation, cross-linking. In other embodiments, ultraviolet (UV) curing may be incorporated. In other embodiments a chemical adhesive accelerator may be applied, for example by spraying. The tubing 104 may be rotated while applying the temperature or radiation in order to create the desired change or set in a controlled, even fashion. The bands 150a-c may be incorporated to function as a number of different elements common in medical devices, including sensors, electrodes, contacts (for electrical connection), and/or heating elements (e.g., resistive heaters). The electrically-conductive adhesive 134 or the dielectric material may each be mixed and degassed (if needed) prior to placement in the syringe 126, or in other embodiments, they may be premixed and stored frozen, then defrosted prior to use. A computer program may be embodied in a non-transitory computer readable medium, that when executing on one or more computers provides instructions to operate at least one of the motors 114, 122, 144.

Medical shafts and tubing often have non-circular outer perimeters. Multi-lumen extrusions typically create non-round cross-sections in tubing, because of uneven cooling or uneven stresses during cooling and set of the polymeric tubing material. Many medical device shafts have composite constructions and include certain elements that cause a non-round cross-section (stiffening wires, electrical wires, guidewire lumens). As it is desired that the bands 150a-c or other features such as the longitudinal tracings 152 be placed smoothly and continuously onto the surface 146 of the tubing 104, regardless of the extent of roundness or non-roundness of the tubing 104, the tubing 104 that is non-round (has a non-circular outer perimeter) is held within the machine 100 so that it is steadied during rotation.

Figure 3:
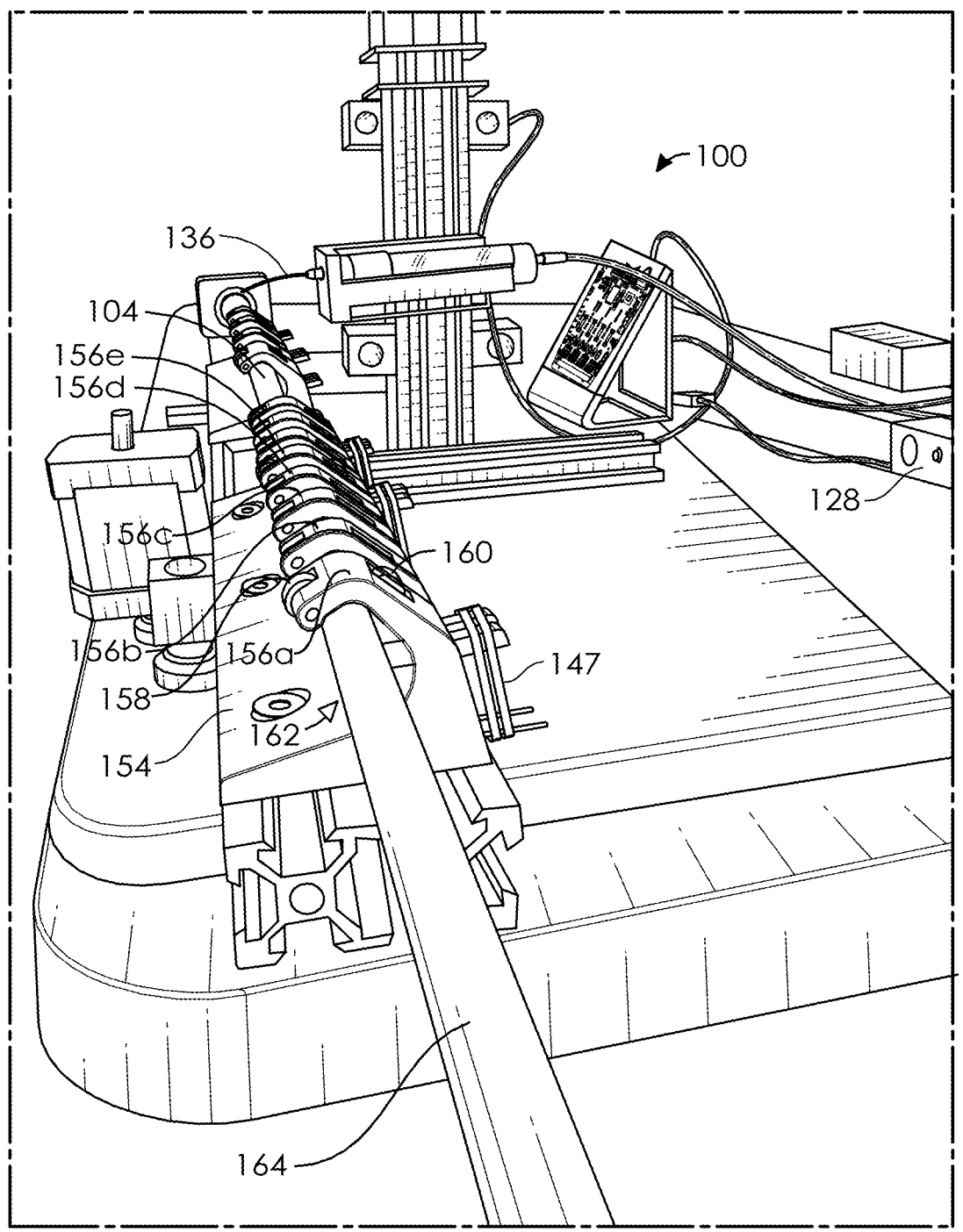
FIG. 3 is a perspective view of the machine of FIG. 1.
Figure 4:
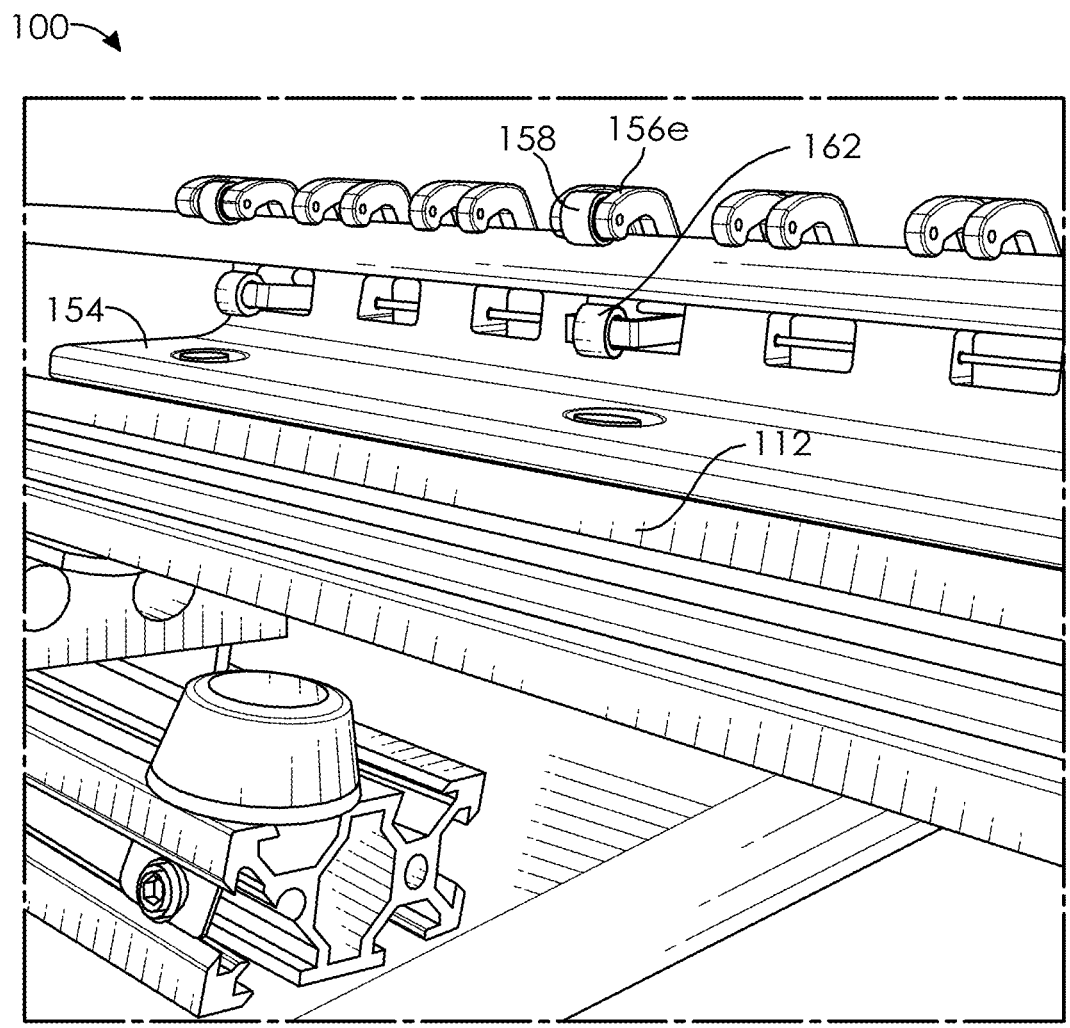
FIG. 4 is a detail view of the dynamic roller bearing of the machine of FIG. 1, according to an embodiment of the present disclosure.

One or more holding members 154 are configured to cradle the tubing 104 as well as to allow the distal portion 140 and orifice the 142 of the needle 136 to have access to the portions of the surface 146 of the tubing 104 that are to be covered or coated. Turning to FIGS. 3 and 4, the holding member 154 includes fingers 156a-e that, along with the holding member 154, hold rollers 158, 160, 162 which are configured to serve as a captured roller v-block to maintain three opposing linear contacts around elongate members having a circular outer perimeter or a non-circular outer perimeter. The rollers 158, 160, 162 are spaced a longitudinal distance from the locking member 116, for example, between about one cm and about 100 cm, or between about 2 cm and about 50 cm, or between about 2 cm and about 25 cm. For example, in FIG. 1, holding member 154a is shown cradling and allowing controlled rotation of a tubing 104 having a non-circular outer perimeter, while holding member 154b is shown cradling and allowing controlled rotation of a mandrel 164 that has a generally circular outer perimeter.

Turning to FIGS. 8-10, a holding member 254 comprises fingers 256a-h which are separated by access troughs 257a-g. A longitudinal space 259 extending the length of the holding member 254 is configured for allowing the placement of tubing 104 or a mandrel 164. Focusing particularly on the first finger 256a, a first roller 258 is rotatable around a first pin 201 which is placed through a hole 203 in a first projection 205 in the finger 256a and through a hole (not shown) in a second projection 209 in the finger 256a. The first roller 258 is configured to rotate around a first axis 211 that is thus stationary in relation to the holding member 254. A second roller 260 is rotatable around a second pin 213 which is placed through a hole 215 in a third projection 217 in the finger 256a and through a hole (not shown) in a fourth projection 219 in the finger 256a. The second roller 260 is configured to rotate around a second axis 221 that is also stationary in relation to the holding member 254. The first roller 258 and second roller 260 form a roller v-block at first portion 223 and second portion 225, respectively. A third roller 262 is rotationally held by a pin 227 through a first hole 229 in a first projection 231 of an arm 233 and a second hole (not shown) in a second projection 237 in the arm 233. The arm 233 is rotationally coupled to the holding member 254 at an axis 239. The arm 233 thus rotates in an arc 241 around the axis 239, which is stationary in relation to the holding member 254. The arm 233 is rotationally held by a pin 242 (through holes in the holding member 254). The third roller 233 rotates around an axis 243 which is stationary in relation to the arm 233 but is moveable (not stationary) in relation to the holding member 254. A first biasing member 247 and second biasing member 249 are shown in FIG. 9 as helical spring elements. The biasing members 247, 249 are analogous to a biasing member 147 of an arm (not visible) in the holding member 154 of FIG. 3, which comprises one or more elastic bands. Other types of biasing members including helical and non-helical springs may be used. These include leaf springs, living hinges and intervening compression materials that are configured to perform within their elastic limit. Returning to FIG. 9, the first biasing member 247 is coupled to the arm 233 and a first portion 251 of the holding member 254 and the second biasing member 249 is coupled to the arm 233 and a second portion 253 of the holding member 254. Thus, the roller 262 is able to adjust by moving closer to or further from the first roller 258 and second roller 260, to adjust to changes in the transverse dimension of non-round tubing or shafts, thus allowing rolling three-point (line) contact at all points on the surface 146 of the tubing 104 during the rotation of the tubing 104. This is described in more detail in FIGS. 11-15.

FIG. 11 illustrates the holding member 254 of FIG. 8 with a two-lumen tubing 270, having a first lumen 272 and a second lumen 274, each extending therein. The holding member 254 in FIG. 11 is modified from the holding member 254 of FIG. 8 in that its biasing members 247, 249 have been replaced by an internal leaf spring 261 between the arm 233 and the holding member 254. The tubing 270 has a non-circular outer perimeter, with a substantially D-shape. As the tubing 270 is rotated (e.g., by the motor 114 of the machine 100), the arm 233 opens or closes, from bias applied by the leaf spring 261 so that the roller 262 maintains contact with the surface 263 of the tubing 270, while the roller 262 also forces the tubing 270 against each of the rollers 258, 260. Thus, the movement of the arm 233 allows the rollers 258, 260, 262 to serve as a variable bearing. In FIG. 12, the first lumen 272 and second lumen 274 are arrayed left and right, respectively. In FIG. 13, the tubing 270 has been rotated 60° in the rotational direction denoted by the curved arrow. In FIG. 14, the tubing 270 has been rotated an additional 30° in this same rotational direction. In FIG. 15, the tubing 270 has been rotated in an additional 60° in this same rotational direction. In all cases, the rollers 258, 260, 262, each maintain contact with the surface 263 of the tubing 270, thus stabilizing and maintaining the orientation of the tubing. It should be noted that the longitudinal axis 265 of the tubing 270 does not necessarily stay stationary in relation to the holding member 254, as the tubing 270 is able to move up, down, left, or right as needed to maintain contact with the rollers 258, 260, 262. As will be seen, other means are also described herein to maintain the orifice 142 of the needle 136 in proximity to the surface 263 of the tubing 270.

Figure 7A:
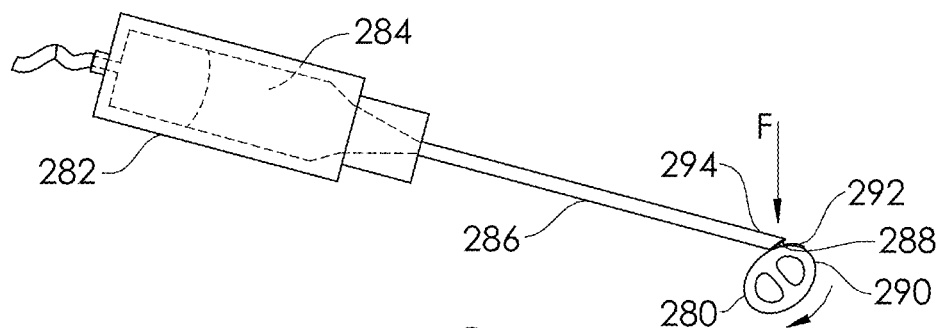
FIG. 7A is a detail view of an adhesive dispenser and needle according to an embodiment of the present disclosure.
Figure 7B:
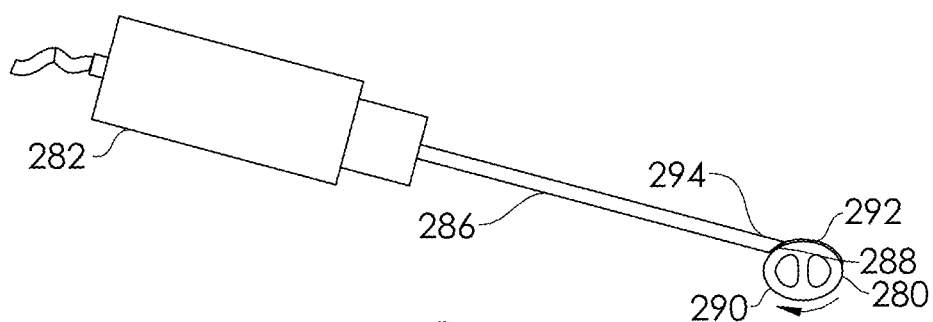
FIG. 7B is a detail view of the adhesive dispenser of FIG. 7A after additional tube rotation.

FIG. 7A illustrates a two-lumen, oval-shaped tube 280 being rotated in a rotational direction corresponding to the curved arrow. A syringe 282 injects a conductive adhesive 284 through a tubing 286 (which may include hypodermic tubing or a needle) and out through an orifice 288, which applies the conductive adhesive 284 onto the surface 290 of the tube 280 creating a feature 292. The distal portion 294 of the tubing 286 is pressed down against the surface 290 of the tube 280 with a preload force F, such that when the tube 280 is rotated to the position in FIG. 7B, the distal portion 294 of the tubing 286 (and thus the orifice 288) moves down (e.g., via flexure) and stays in contact with the surface 290 of the tube 280. The distal portion 294 is configured to stay in contact with the surface 290 of the tube 280 throughout an entire rotation of the tube 280 and throughout multiple rotations of the tube 280. Thus, a preload force F can be chosen that assures that the orifice 288 of the tubing 286 stays in proximity to the surface 290 of the tube 280 through all 360° of rotation of the non-circular outer perimeter. In FIGS. 7A and 7B, the preload force is biased, entirely based on the cantilever bending of the tubing 286, which may be a metallic material like stainless steel, or may be a polymeric material such as PTFE, polyethylene, or polypropylene. The diameter, length or wall thickness of the tubing 286 may be modified for each different material (modulus) chosen, in order to achieve the desired pre-load force. Additionally, a particular loaded displacement (strain) may be chosen to achieve the desired pre-load. Though a wide array of tubing 286 may be utilized in any of the embodiments described herein, a representative tubing 286 includes 304 stainless steel hypodermic tubing having an inner diameter of between 0.0045 inches and 0.0095 inches, or between about 0.005 inches and about 0.007 inches.

Figure 7C:
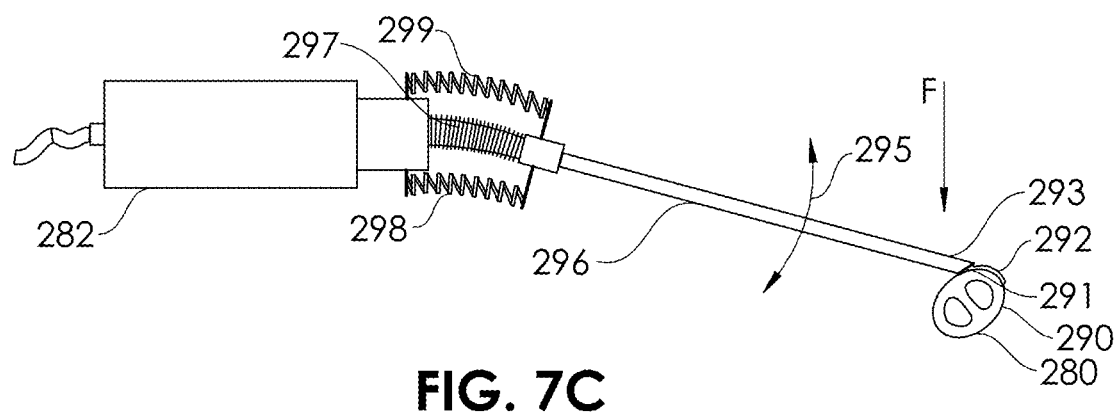
FIG. 7C is a detail view of an adhesive dispenser and needle according to an embodiment of the present disclosure.

FIG. 7C illustrates an alternative embodiment, wherein the preload bias is achieved by a biasing element instead of the cantilever bending of the tubing 296. The syringe 282 is fluidly attached to tubing 296 via a hollow, flexible bellows 297, which allows angular displacement (angulation) 295 between the tubing 296 and the syringe 282. An extension spring 298 and an opposing compression spring 299 provide the preload force F that biases the distal portion 293 of the tubing 296 (and thus, the orifice 291) against the surface 290 of the tube 280. In other embodiments, only an extension spring 298 is utilized. In other embodiments, only a compression spring 299 is utilized. In other embodiments, the springs 298, 299 are not utilized, but instead the flexible bellows 297 is heat-formed in a curved shape from a shape-memory polymer, thus making it the biasing element. In some embodiments, the preload bias may be achieved by a combination of bending of the tubing 286 and the displacement of the compression springs 298, 299.

Figure 7D:
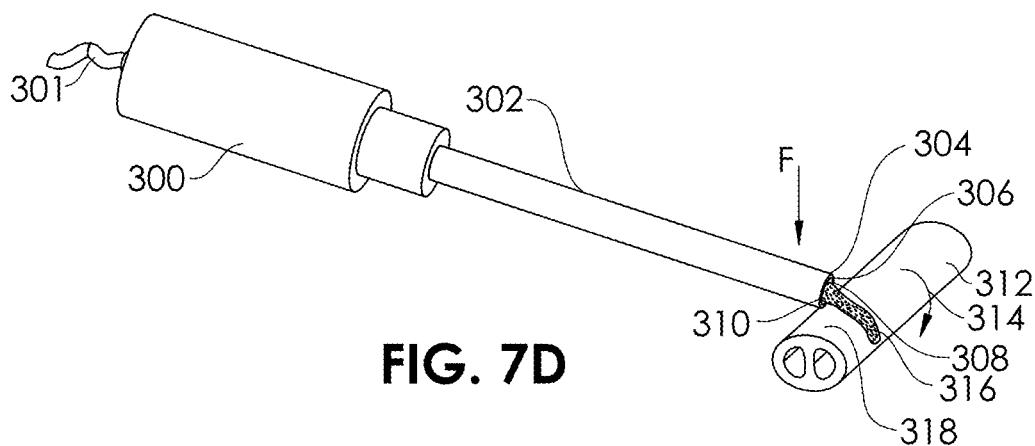
FIG. 7D is a detail view of an adhesive dispenser and needle according to an embodiment of the present disclosure.
Figure 7E:
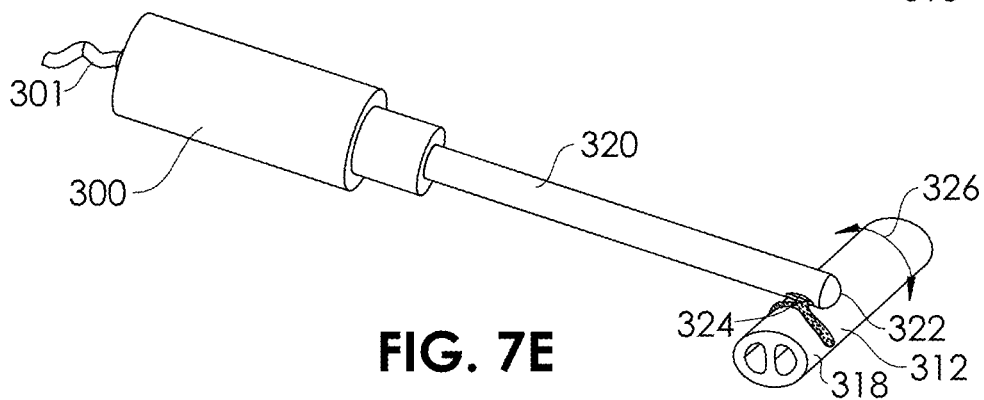
FIG. 7E is a detail view of an adhesive dispenser and needle according to an embodiment of the present disclosure.
Figure 7F:
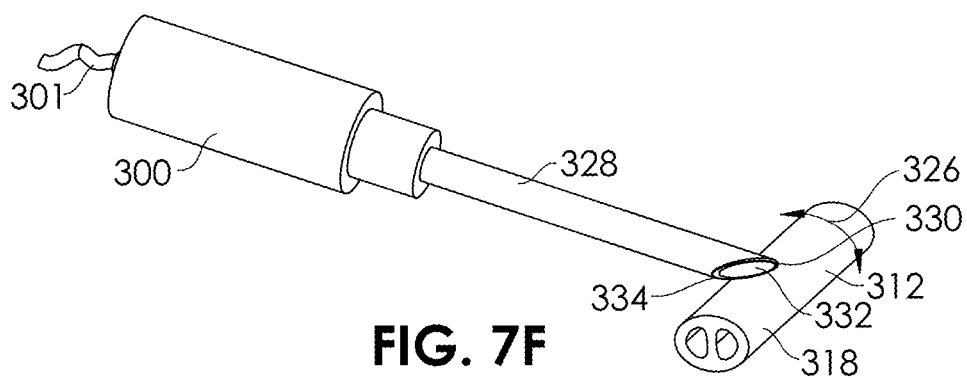
FIG. 7F is a detail view of an adhesive dispenser and needle according to an embodiment of the present disclosure.
Figure 7G:
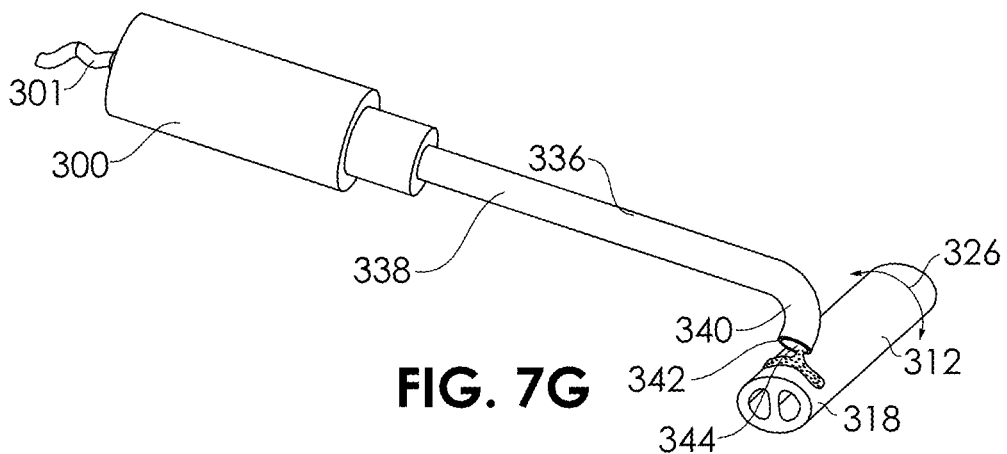
FIG. 7G is a detail view of an adhesive dispenser and needle according to an embodiment of the present disclosure.

FIG. 7D illustrates a syringe 300 with a gas line 301 and dispenser tube 302 having a transverse cut 304 at the distal end 306 and having an orifice 308 oriented transversely to the dispenser tube 302 in a standard manner. The edge 310 at the distal end 306 has not been filleted or otherwise smoothed, and so the tubing 312 is rotated only in a first direction 314 to apply the conductive adhesive 316 because rotation in the opposite direction would risk the edge 310 getting caught on the surface 318 of the tubing 312 if a preload force F is applied. In some embodiments, the single direction 314 is the only rotational direction necessary to apply a desired pattern on the surface 318 of the tubing 312. FIG. 7E, however, illustrates a syringe 300 with a dispenser tube 320 which has a closed end 322 and a side hole orifice 324. The side hole orifice 324 may slide along the surface 318 of the tubing 312 in either direction of rotation 326. FIG. 7F illustrates a syringe 300 with a dispenser tube 328 having a beveled end 330 with an orifice 332. The beveled end 330 minimizes the edge 334 by making it an obtuse angle, and thus allowing free rotation of the tubing 312 in either direction of rotation 326. FIG. 7G illustrates a syringe 300 with a dispenser tube 336 having a straight proximal portion 338 and a distal portion 340 that is angled in relation to the proximal portion 338. The transition between the straight proximal portion 338 and the angled distal portion 340 may be a gradual or continuous curve, or may be closer to a right angle (with some radius of curvature at the apex). The end 342 of the dispenser tube 336 rides flush along the surface 318 of the tubing 312, and this allows the end 342 and the orifice 344 to stay in proximity to the surface of the tubing 312 while the tubing 312 is rotated in either direction of rotation 326. As in the other tubes/needles, etc., the dispenser tube 336 may apply a bias by means of its cantilever bending, or by an additional biasing element, or by a combination of the two. The curvilinear shape of the dispenser tube 336 may be constructed with the angle, radius or curvature and/or length to best orient the orifice 344 of the dispenser tube 336 adjacent the surface of the tubing 312, and the apply the desired bias on the tubing 312.

Figure 7H:
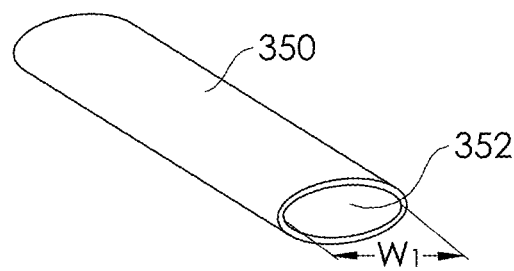
FIG. 7H is a detail view of an adhesive dispenser and needle according to an embodiment of the present disclosure.
Figure 7I:
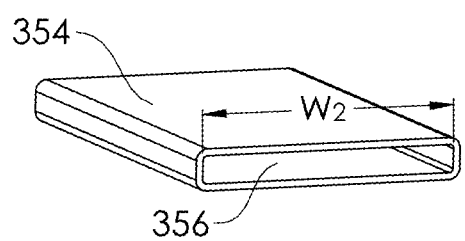
FIG. 7I is a detail view of an adhesive dispenser and needle according to an embodiment of the present disclosure.
Figure 7J:
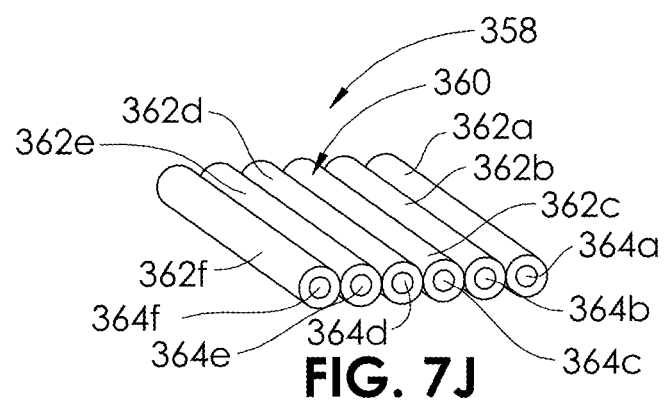
FIG. 7J is a detail view of an adhesive dispenser and needle according to an embodiment of the present disclosure.
Figure 16:
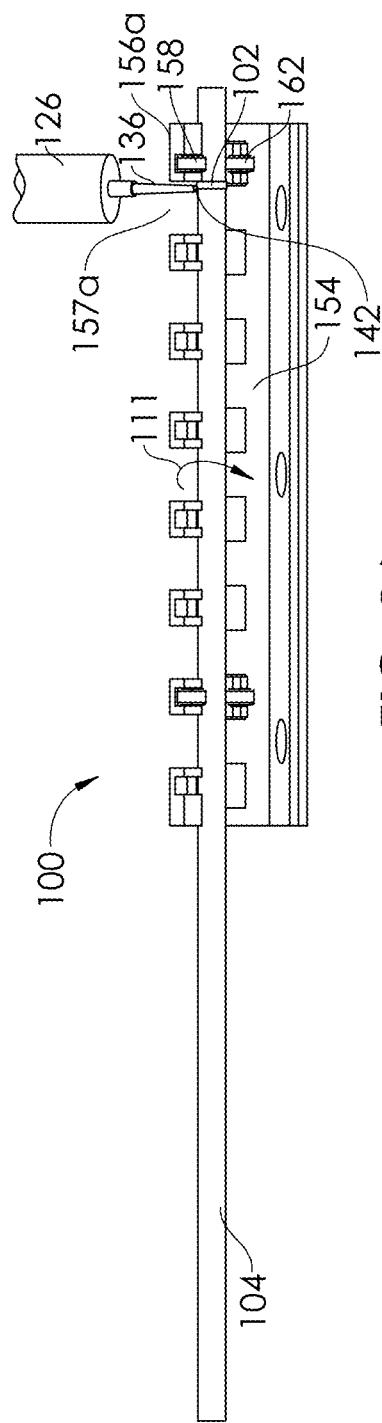
FIG. 16 front view of the machine of FIG. 11 at a first stage of operation.

The dispenser tubes 302, 320, 328, 338 shown in FIGS. 7D-7G are made with circular tubing having a lumen with a circular cross-section. However, other configurations of dispenser tubes may be desirable, including oval, elliptical, rectangular square, triangular, or other polygon shapes. The orifice may also include other shapes, such as circular, oval, elliptical rectangular, square, triangular or other polygonal shapes. FIG. 7H illustrates an oval-shaped dispenser tube 350 having an oval-shaped orifice 352. An increased width $W_1$ of adhesive application can be achieved with each particular lumen cross-sectional area. When the width $W_1$ is oriented along the longitudinal axis of the tubing begin covered with the adhesive, the number of rotations of the tubing that is required to form a pattern can be lessened. The pattern may include, for example, a 360° band formed on the tubing with the adhesive. The reduced number of rotations necessary can thus reduce the time and expense of producing a component with this method. FIG. 7I illustrates a substantially rectangular dispenser tube 354 having a substantially rectangular orifice 356. The tube 354, by having a somewhat large aspect ratio, allows for an even larger width $W_2$ for each particular lumen cross-sectional area. FIG. 7J illustrates a composite dispenser tube 358 comprising a multi-tube array 360, wherein each individual tube 362a-f is fluidly coupled to the syringe (e.g., via a hub), and has an end orifice 364a-f. The composite dispenser tube 358 is similar to the rectangular dispenser tube 354 if FIG. 7I, but can be made by simply attaching several standard hypodermic tubes together in a linear array. In addition, the small diameter of each tube allows for increased bending flexibility, if that characteristic is desired.

Figure 17:
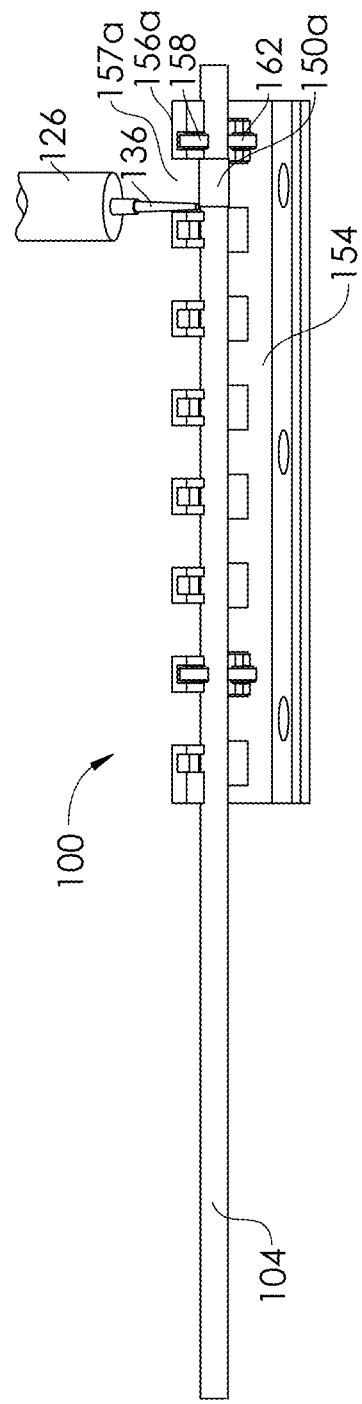
FIG. 17 front view of the machine of FIG. 11 at a second stage of operation.

FIGS. 16-21 illustrate the machine 100 in use applying a conductive adhesive 102 to tubing 104. The orifice 142 of the needle 136 of the syringe is directed by the controller 124 (FIG. 6) into the trough 157a towards the finger 156a (FIG. 16) and the tubing 104 is rotated (in rotational direction 111) by the motor 114 (FIG. 1). The adhesive 102 is applied with while the tubing 104 is rotated and the motor 122 longitudinally translates the tubing 104 to form a conductive band 150a (FIG. 17). The relative path that the orifice 142 takes along the surface of the tubing 104 may be a helix, or may comprise a series of concentric circles, arrayed longitudinally. To form a helix, the motor 114 and the motor 122 may each operate at constant speeds. To form a series of concentric circles, the motor 114 may operate while the motor 122 is stopped, to form a 360° or more application of the adhesive 102, and then the motor 122 may index the tubing 104 a distance slightly less than the width of the applied adhesive 102 (thus to cause at least some overlap). Then, the motor 114 may operate while the motor 122 is again stopped, to form another 360° band that slightly overlaps the first, and creates a wider resultant band. The conductive band 150a may cover at least 180 degrees of the surface along the circular or non-circular outer perimeter of the tubing 104, or at least 270 degrees, or 360 degrees. The conductive band 150a may have a length of at least two millimeters along the longitudinal axis of the tubing 104, or at least five millimeters, or between about one millimeter and about twenty millimeters, or between about two millimeters and about ten millimeters. The controller 124 may give commands to the motors 114, 122 so that in continuous operation they create the helical motion, or the controller 124 may include stop and start commands for the motors 114, 112 to create the motion comprising a series of concentric circles. FIG. 18 illustrates the syringe 126/needle 136 being moved out of the trough 157a (e.g., in an upward direction) by the one or more motors 144 (FIG. 1) via commands from the controller 124. FIG. 19 illustrates the tubing 104 being moved longitudinally (to the right in FIG. 19) by the motor 122 via commands from the controller 124. The orifice 142 of the needle 136 of the syringe 126 is directed by the controller 124 into the trough 157c toward the finger 156c (FIG. 20) and the tubing 104 is rotated (in rotational direction 111) by the motor 114. The adhesive 102 is applied with while the tubing 104 is rotated and the motor 122 longitudinally translates the tubing 104 to form another conductive band 150c (FIG. 21).

Figure 22:
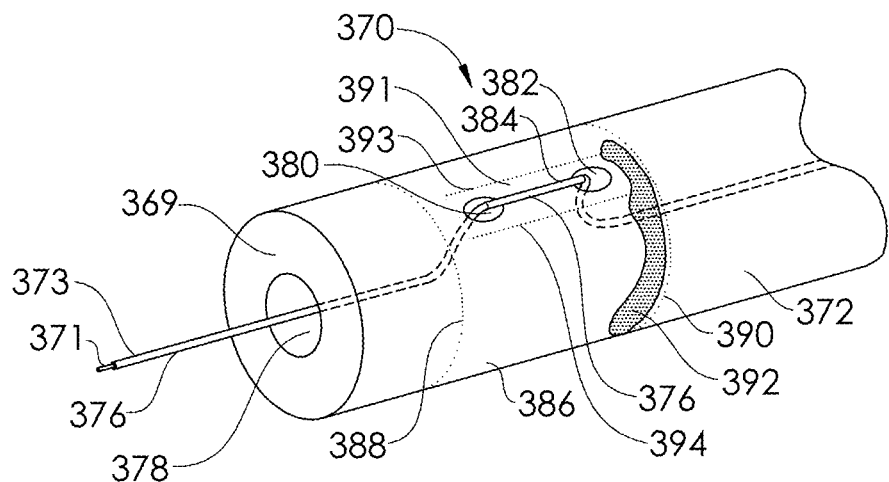
FIG. 22 is a perspective view of a component during a first process of forming an electrical connection according to an embodiment of the present disclosure.
Figure 23:
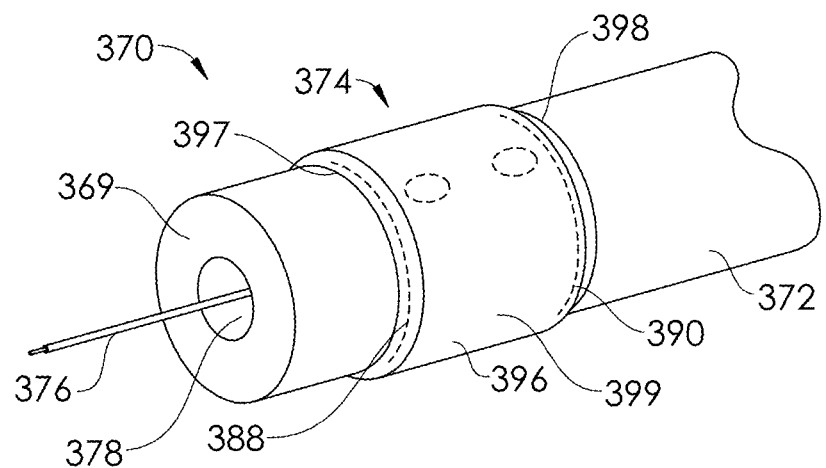
FIG. 23 is a perspective view of the component of FIG. 22 after a second process of forming an electrical connection.

FIG. 22 illustrates a medical device 370 comprising a polymeric tube 372 in which an electrical connection 374 is to be formed (FIG. 23). A conductor 376, comprising, for example, copper wire 371 having an insulative cover 373, is passed through a lumen 378 in the tube 372. Two holes 380, 382 are formed in a wall 369 of the tube 372 and the conductor 376 is passed out of the first hole 380 and back into the second hole 382. In some embodiments, the conductor 376 continues to extend through the lumen 378, and may even be secured (adhesively or epoxy bonded) therein. The section 384 which extends outside of the tube 372 between the first hole 380 and the second hole 382 has its external electrical insulation material 373 removed. This may be done at the section 384 wither before the conductor 376 is passed through the two holes 380, 382 or afterward. A first coating or covering process is then performed utilizing a first conductive adhesive 392 having a first viscosity to cover area 386 between line 388 and line 390. The first conductive adhesive 392 may be applied manually, or with the machine 100 described herein in any of its embodiments. Following this first coating or covering process the section 384 of the exposed wire 371 is held to a surface 394 of the tube 372. Because the first conductive adhesive 392 has been chosen which exhibits a sufficiently high viscosity during application (e.g., in an uncured state), it is able to, for example, fill the holes 380, 382 at least partially to form a stronger joint. It may be desired, for example, to only apply the first conductive adhesive 392 in area 391 within dotted line rectangle 393. In a second coating or covering process, as shown in FIG. 23, utilizing the machine 100 described herein in any of its embodiments, a second conductive adhesive 396 is applied over the first conductive adhesive 392 to form a conductive band 399 extending between line 397 and line 398. The second conductive adhesive 396 may be chosen such that it has a lower viscosity during application than does the first conductive adhesive 392, and such that it adheres well to the first conductive adhesive 392, assuring good electrical contact. The first conductive adhesive 392 may be fully set up, solidified, or cured prior to the application of the second conductive adhesive 396, or it may be only partially set up, solidified, or cured. Thus, the first coating or covering process, the first conductive adhesive 392 provides a "tack" or "setup" while in the second coating or covering process, the second conductive adhesive completes the electrical connection 374. The electrical connection 374 thus conductively unites the wire 371 and the conductive band 399. Using this process, the electrical connection 374 is significantly free from voids, and thus has a high level of reliability in the flow of current.

Figure 24:
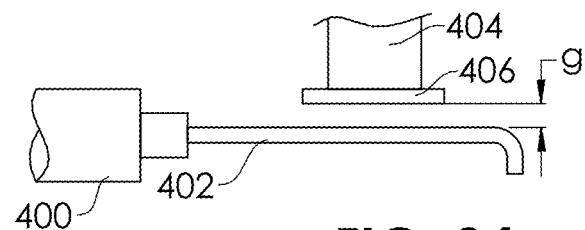
FIG. 24 is a side view of a proximity sensor according to an embodiment of the present disclosure.

The needle 136 (FIG. 5) of the machine 100 (FIGS. 1-2) may be moved by commands from the controller 124 or may be moved manually, as previously described. Additionally, one or more sensing devices may be utilized in the machine 100 to control the movement of the needle 136, and thus the location of the orifice 142. A syringe 400 having a needle 402 is illustrated in FIG. 24. A capacitive proximity sensor 404 having a plate 406 senses a gap g between the plate 406 and the needle 402. The capacitive proximity sensor 404 may be utilized for gross location (the general target area), or finer, precision placement of the needle 402.

Figure 25:
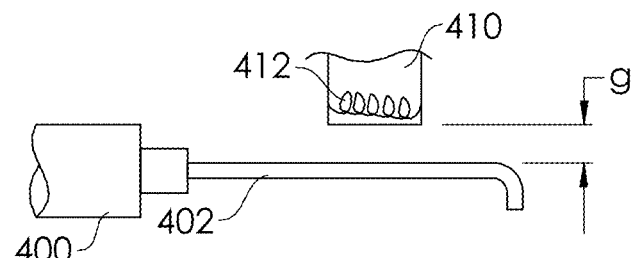
FIG. 25 is a side view of a proximity sensor according to an embodiment of the present disclosure.

A syringe 400 having a needle 402 is illustrated in FIG. 25. An inductive proximity sensor 410 having an inductive coil 412 senses a gap g between the inductive coil 412 and the needle 402. The needle 402 comprises a metallic material, for example stainless steel. The inductive proximity sensor 410 may be utilized for gross location (the general target area), or finer, precision placement of the needle 402.

Figure 26:
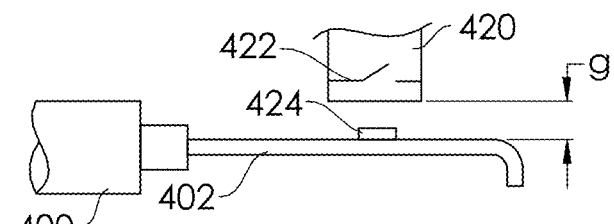
FIG. 26 is a side view of a proximity sensor according to an embodiment of the present disclosure.

A syringe 400 having a needle 402 is illustrated in FIG. 26. A small magnet 424 is carried by the needle 402. A magnetic proximity sensor 420 having a reed switch 422 senses a gap g between the reed switch 422 and the magnet 424 of the needle 402. The magnetic proximity sensor 420 may be utilized for gross location (the general target area), or finer, precision placement of the needle 402.

Figure 27:
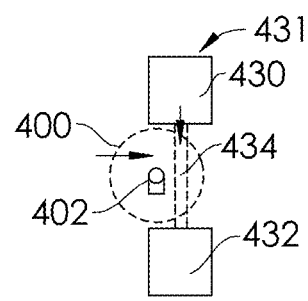
FIG. 27 is a end view of a proximity sensor according to an embodiment of the present disclosure.

A syringe 400 having a needle 402 is illustrated in FIG. 27. A laser micrometer 431 comprising an emitter 430 and a receiver 432 transits a scanning beam 434 from the emitter 430 to the receiver 432, in the direction of the vertical arrow. The laser micrometer 431 may be programmed to sense when the needle 402 begins to cross the scanning beam 434, for example, when moving in the direction of the horizontal arrow into the beam 434. The laser micrometer 431 may be utilized as a proximity sensor for gross location (the general target area), or finer, precision placement of the needle 402. In any of the embodiments described in FIGS. 24-27, the controller 124 may be programmed to stop the motion of the needle 402 when a particular gap g or particular location of the needle 402 is sensed. A desired gap g may be input into memory, e.g, with a user interface, such that the controller 124 compares the selected gap g value.

Devices that may incorporate the improvements taught herein include standard or modified endo-tracheal tubes, nasogastric (NG) tubes, laryngeal masks, gastric lavage tubes, gastric aspiration tubes, gastric decompression tubes, Ewald orogastric tubes, Lavacutor® orogastric tubes, Edlich orogastric tubes, sump tubes, Salem tubes, Levin tubes, gastric suction/feeding tubes, Moss Mark IV nasal tubes, Dobbhoff nasojejunal feeding and gastric decompression tubes, nasointestinal tubes, Miller-Abbott tubes, or Sengstaken-Blakemore tubes.

Other embodiments are envisioned which do not incorporate the application of a conductive material, but rather a non-conductive material. Some embodiments may incorporate resistive, including highly-resistive materials, which may be used to construct a device for delivering thermal therapy to a portion of the body via resistive heating. Some embodiments may incorporate a radiopaque material. Devices that may incorporate the resistive materials include devices for trans-urethral ablation (for example to stop bleeding), trans-uterine sterilization (e.g., fallopian tubes), electrocardiology ablation procedures, or brachytherapy.

Figure 28:
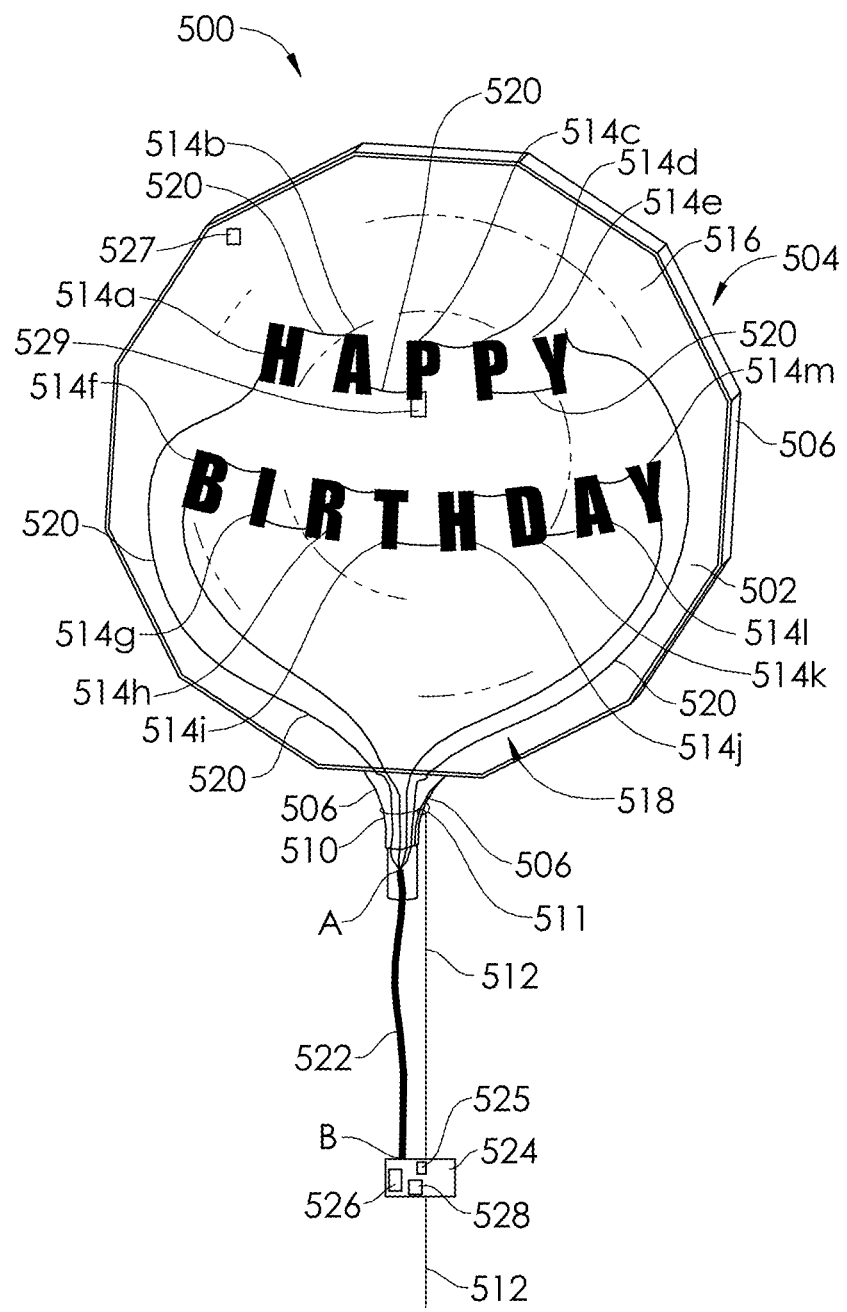
FIG. 28 is a perspective view of a balloon having electroluminescent elements.

In additional to medical devices, other products may be constructed using some or all of the methods and apparatus for placing patterns of material onto non-planar surfaces disclosed herein. FIG. 28 illustrates an inflatable balloon 500 comprising a first sheet of material 502 (or wall) secured to a second sheet of material 504 along a peripherally-extending seam 506. The first and second sheets may comprise polyester, such as polyethylene terephthalate (PET). The first and second sheets 502, 504 may be secured at the seam 506 using a flexible adhesive, like urethane adhesive, or flexible tape strips, including Uglu® adhesive strips manufactured by Morgan Adhesives Company of Stow, Ohio, USA, or Stretchy™ Balloon Tape. An inlet 510 is located on the bottom of each of the first and second sheets 502, 504, and is configured for filling the balloon 500 with a lighter-than-air gas, such as helium. A string 512 may be secured to the balloon 500, for example, at the inlet 510. The string 512 may be used to tie off the inlet 510, e.g. at a knot 511, or a separate plug (not shown) may be placed into the inlet 510 to block flow of the gas out of the inlet 510. The balloon 500 is shown in FIG. 28 in an inflated state, and electroluminescent characters 514a-m are carried on a surface 516 of the first sheet 502. Though the electroluminescent characters 514a-m are shown as letters, in other embodiments, the electroluminescent characters 514a-m may be replaced by or augmented by other electroluminescent characters, designs, or pictures. Additional electroluminescent characters 514a-m may be carried on a surface (not shown) of the second sheet 504. A circuit 518 including traces 520, a multiwire cable 522, and a printed circuit board (PCB) 524 are electrically-connected to each other (e.g., by soldering), and to the electroluminescent characters 514a-m. The traces 520 (or tracings) and the electroluminescent characters 514a-m may each be applied to the first sheet 502 (or the second sheet 504) by the methods and apparatus disclosed herein. For example, a machine having two or more motors may be utilized to move a tubular conduit of a syringe and the inflated balloon 500 in relation to each other, to apply an electroluminescent material in a predetermined pattern and/or to apply a conductive adhesive in a predetermined pattern, to create the electroluminescent characters 514a-m and the traces 520, respectively. The cable 522 may be connected to the PCB 524 (at point B) and to the traces 520 (at point A) by soldering or by electrical clips or connectors. The PCB 524 includes a power source 526, which may include one or more batteries. A microprocessor 525 is also carried on the PCB 524, and may be configured to cause one or more of the electroluminescent characters 514a-m, for example, in a particular pattern or timing, to light in response to motion (sensed by an accelerometer 527 electrically coupled to the circuit 518) or being touched (sensed by a capacitive or resistive touch sensor 529 electrically coupled to the circuit).

Electroluminescence is an optical phenomenon and electrical phenomenon in which a material emits light in response to the passage of an electric current. The power source 526 supplies a voltage to cause a current to pass through the cable 522, the traces 520, and the electroluminescent characters 514a-m, causing the electroluminescent characters 514a-m to illuminate a message, such as "HAPPY BIRTHDAY," or a picture or design. The PCB 524 may include one or more timer circuits 528 in order to cause one or more electroluminescent character 514 to illuminate at different times. For example, the word "HAPPY" may be caused to illuminate by itself first for one second, and then both the words "HAPPY" and "BIRTHDAY" may subsequently be illuminated together for three seconds, followed by one-half second with neither the word "HAPPY" nor the word "BIRTHDAY" being illuminated. In other embodiments, the one or more timer circuits 528 may be configured to cause each letter to begin illuminating, one after the other. For example, "H" lights and stays lit, and then "A" lights so that "HA" is visible, etc., until "HAPPY BIRTHDAY" is illuminated. In general, during a first time period, a first subset of the electroluminescent characters 514a-m is lit while a second subset of the electroluminescent characters 514a-m is not lit. During a second time period, a third subset of the electroluminescent characters 514a-m comprising one or more of the electroluminescent characters 514a-m of the second subset is lit. In some embodiments, during the second time period, one or more of the electroluminescent characters 514a-m of the first subsets may be turned off. In some embodiments, the first subset and the second subset are both on the same surface 516 of the balloon 500. In other embodiments, the first subset is one a first surface 516 and the second subset is on a second surface. Multiple circuits 518 may be employed in some embodiments, to provide a more complex array of flashing or lighting options, or to provide backup in case of the failure of one of the circuits 518.

Examples of electroluminescent materials that may be utilized to form the electroluminescent characters 514 include: zinc sulfide doped with manganese, which emits yellow-orange light; powered zinc sulfide doped with copper, which emits green light; powdered zinc sulfide doped with silver, which emits blue light. Other materials include: natural blue diamond doped with boron; semiconductors comprising light emitting diodes (LEDs) using Group III or Group V elements, such as indium phosphate, gallium arsenide, or gallium nitride; and organic semiconductors including tris (2,2'-bipyridine) ruthenium (II) hexafluorophosphate. In some embodiments, the electroluminescent characters 514 may comprise a hyper-elastic light-emitting capacitor (HLEC).

Figure 29:
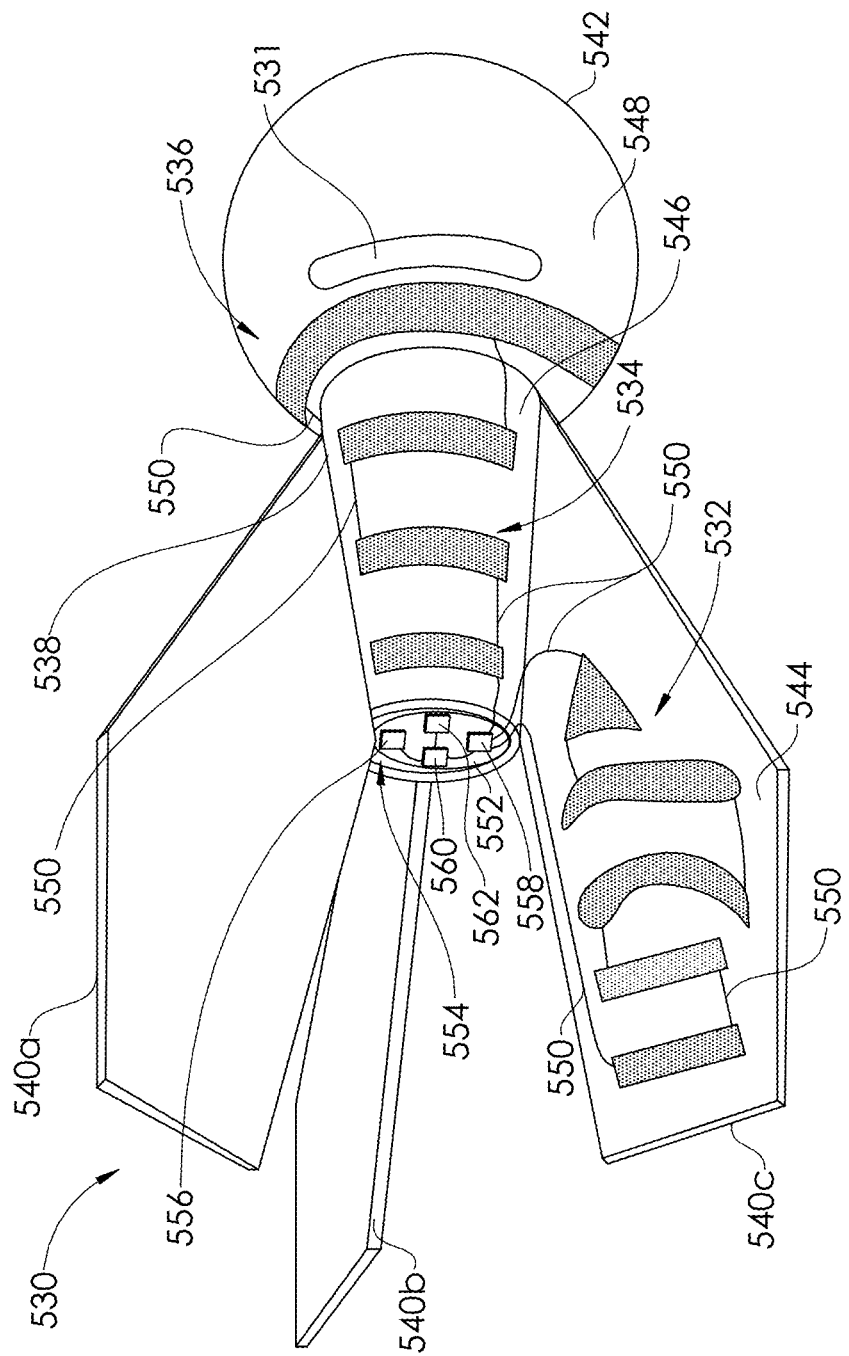
FIG. 29 is a perspective view of a toy dart having electroluminescent elements.

FIG. 29 illustrates a toy dart 530 which may be constructed using some or all of the methods and apparatus disclosed herein. A machine having two or more motors may be utilized to move a tubular conduit of a syringe and the toy dart 530 in relation to each other, to apply an electroluminescent material in a predetermined pattern and/or to apply a conductive adhesive in a predetermined pattern, to create one or more electroluminescent designs 532, 534, 536 and traces 550, respectively. Electroluminescent designs 532, 534, 536 are shown in FIG. 29, and in other embodiments may include characters (e.g., messages) or pictures. The dart 530 includes a body 538 having three fins 540a-c secured to the body 538 and extending radially, and a soft foam head 542. The head 542 is shown with a spherical shape, but it may be ovoid, conical, or other symmetric or even non-symmetric shapes. One or more of the body 538, fins 540, and head 542 may comprise a foam, for example, a polyurethane foam. The electroluminescent designs 532 have been applied to one surface 544 of a fin 540c, and may additionally be applied to the other surfaces of the fins 540a-c. The electroluminescent designs 534 have been applied to the body 538 at a surface 546 between fin 540a and fin 540c, but may also be applied to other portions of the body 538. The electroluminescent designs 536 have been applied to the head 542 at one portion 548, but may additionally be applied to other portions of the head 542. Traces 550 extend between the electroluminescent designs 532, 534, 536, and may comprise conductive adhesives, as described herein, and may be covered completely or partially with a dielectric material. A flex circuit 552, may be curled and inserted within a cavity 554 in the body 538. The flex circuit 552 carries one or more batteries 556 and one or more timer circuits 558, which function in the same manner as those of the balloon 500 of FIG. 28. A microprocessor 560 is also carried on the flex circuit 552, and may be configured to cause one or more of the electroluminescent designs 532, 534, 536, for example, in a particular pattern or timing, when the head 542 of the dart 530 makes contact with an object. The flex circuit 552 may include an accelerometer 562 for determining when the head 542 of the dart 530 contacts an object. The microprocessor 560 may be configured to cause a particular pattern or sequence to illuminate depending on the level and orientation of deceleration that is measured by the accelerometer 562. A capacitive or resistive touch sensor 531 may also be incorporated into any portion of the toy dart 530. For example, the microprocessor 560 may be configured to cause a flashing of one, several, or all of the electroluminescent designs 532, 534, 536 for a time period of two, three, four, five, six, seven, eight, nine, ten, twenty, thirty, sixty or more seconds when the touch sensor 531 is touched. Alternatively or additionally, the microprocessor 560 may be configured to cause a flashing of one, several, or all of the electroluminescent designs 532, 534, 536 for a time period of two, three, four, five, six, seven, eight, nine, ten, twenty, thirty, sixty or more seconds when the accelerometer 562 outputs a signal pattern indicating that the toy dart 530 has been thrown.

Figure 30:
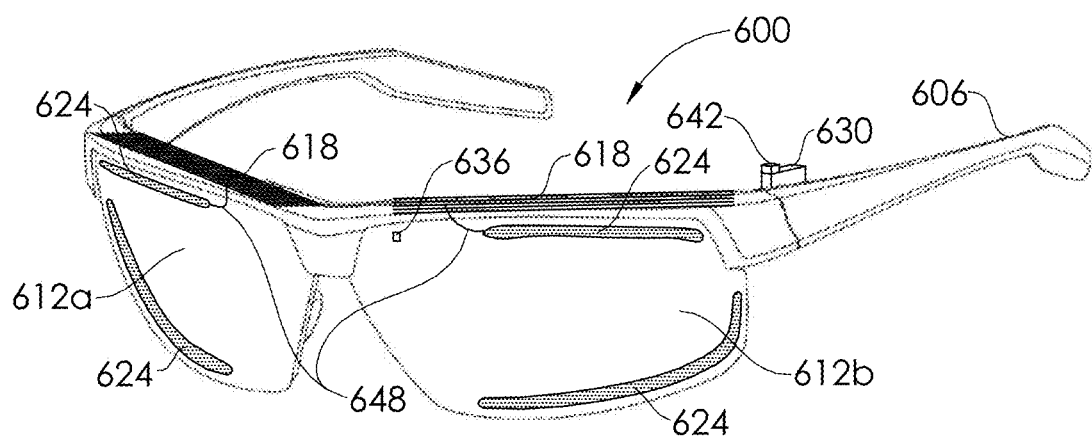
FIG. 30 is a perspective view of eyeglasses having resistive heating elements.
Figure 31:
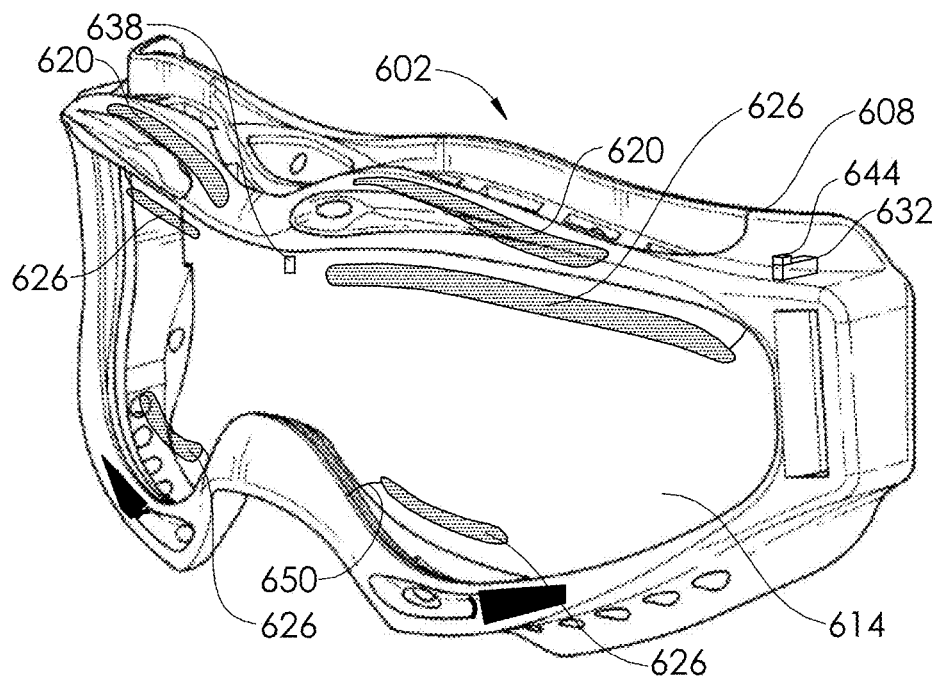
FIG. 31 is a perspective view of ski goggles having resistive heating elements.
Figure 32:
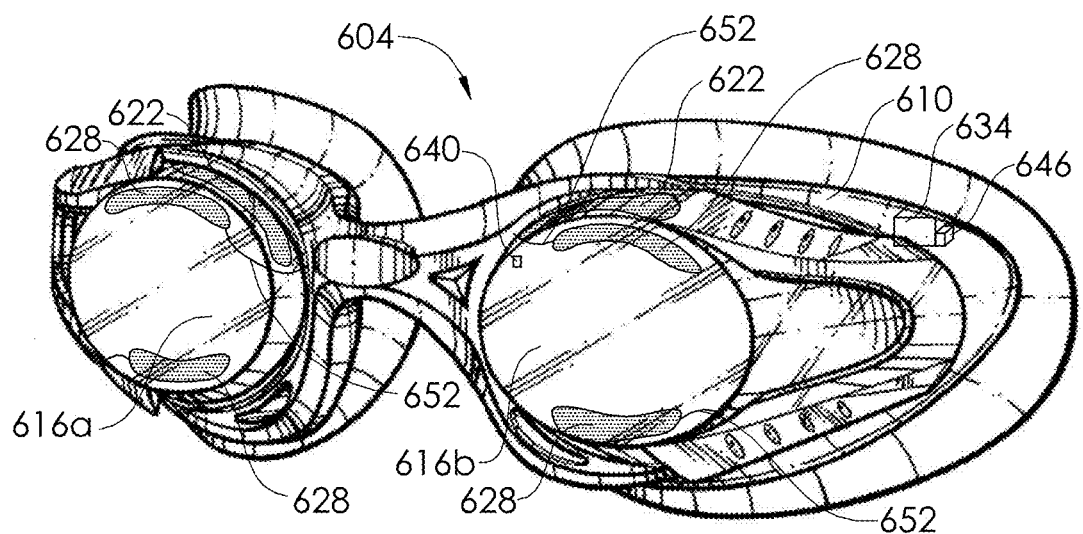
FIG. 32 is a perspective view of swim goggles having resistive heating elements.

Antifogging eyewear are disclosed and represented by antifogging eyeglasses 600 in FIG. 30, antifogging ski goggles 602 in FIG. 31, and antifogging swim goggles 604 in FIG. 32. The eyewear 600, 602, 604 include frames 606, 608, 610 and lenses 612a, 612b, 614, 616a, 616b, which are supported by the frames 606, 608, 610. The eyewear may include resistive heater traces 618, 620, 622 applied to the frames 606, 608, 610 using some or all of the methods and apparatus disclosed herein, and/or may include resistive heater traces 624, 626, 628 applied directly to the lenses 612a, 612b, 614, 616a, 616b using some or all of the methods and apparatus disclosed herein. In use, current is passed through the resistive heater traces 618, 620, 622, 624, 626, 628 by circuits 630, 632, 634 which may include any of the elements or configurations of the PCB 524 or the flex circuit 552 in the prior embodiments (FIGS. 28-29), all of which may be connected by electrically conductive traces 648, 650, 652. A machine having two or more motors may be utilized to move a tubular conduit of a syringe and the eyeglasses or goggles 600, 602, 604 in relation to each other, to apply the resistive heater traces 618, 620, 622, 624, 626, 628 or the electrically conductive traces 648, 650, 652. The circuits 630, 632, 634 may also couple to a humidity sensor 636, 638, 640 secured to an internal surface of the lenses 612a, 612b, 614, 616a, 616b. The humidity sensor may comprise an SHTW2 manufactured by Sensirion of Staefa, Switzerland. A microprocessor 642, 644, 646 carried on the circuit 630, 632, 634 may be configured to control the amount of current passing through the resistive heater traces 618, 620, 622, 624, 626, 628. In some embodiments, the microprocessor 642, 644, 646 may be configured to control the amount of current passing through the resistive heater traces 618, 620, 622, 624, 626, 628 as a function of the humidity measured by the humidity sensor 636, 638, 640. Any of the lenses 612a, 612b, 614, 616a, 616b may be configured to be correcting lenses or non-correcting lenses, and may be constructed from glass or polymer materials. The lenses 612a, 612b, 614, 616a, 616b may be constructed for protection against the sun, and may include UV protection and/or may be polarized.

Figure 33:
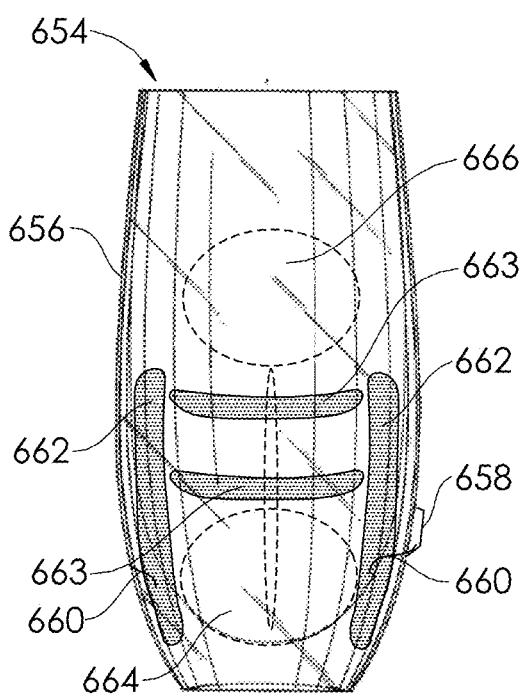
FIG. 33 is a side view of a drinking glass having resistive heating elements.

A self-warming drinking glass 654 having a receptacle body 656 comprising glass, plastic, or ceramic is illustrated in FIG. 33. A circuit 658 electrically connects via electrically conductive traces 660 to one or more resistive heater traces 662, 663. The heater traces 662 are substantially vertically-extending (or substantially longitudinal) and the heater traces 663 are substantially horizontally-extending (or substantially circumferential). Either of the heater traces 662, 663 can be curved to follow the contours of the receptacle body 656. The one or more resistive heater traces 662, 663 may be configured to cover an area 664 of the receptacle body 656 that is not likely to be gripped by the hand of a user. The one or more resistive heater traces 662, 663 may be purposely absent from a gripping area 666 of the receptacle body 656, in order to avoid discomfort for the user caused by a burnt or significantly warm hand. The heater traces 662, 663 may both be applied using some or all of the methods and apparatus disclosed herein. For example, a machine having two or more motors may be utilized to move a tubular conduit of a syringe and the drinking glass 654 in relation to each other, to apply the one or more resistive heater traces 662, 663 or the electrically conductive traces 660.

While embodiments have been shown and described, various modifications may be made without departing from the scope of the inventive concepts disclosed herein.

The ranges disclosed herein also encompass any and all overlap, sub-ranges, and combinations thereof. Language such as "up to," "at least," "greater than," "less than," "between," and the like includes the number recited. Numbers preceded by a term such as "approximately", "about", and "substantially" as used herein include the recited numbers (e.g., about 10%=10%), and also represent an amount close to the stated amount that still performs a desired function or achieves a desired result. For example, the terms "approximately", "about", and "substantially" may refer to an amount that is within less than 10% of, within less than 5% of, within less than 1% of, within less than 0.1% of, and within less than 0.01% of the stated amount.

What is claimed is:

1. A method for applying a predetermined pattern of material onto an elongate tubular substrate, comprising:
   securing a first portion of an elongate tube having a non-circular outer perimeter to an engagement member configured to be rotated by a first motor, such that the elongate tube can be rotated in unison with the engagement member;
   operating the first motor to rotate the elongate tube;
   operating a second motor to change relative displacement between the elongate tube and a dispensing conduit along a longitudinal axis of the elongate tube; and
   expelling a conductive adhesive from a fluid dispenser through the dispensing conduit to form a predetermined pattern of the conductive adhesive on a surface of the elongate tube, the predetermined pattern of the conductive adhesive covering at least 180 degrees of the surface along the non-circular outer perimeter over a width of at least two millimeters along the longitudinal axis.

2. The method of claim 1, wherein the surface of the elongate tube is located at a second portion of the elongate tube, different from the first portion of the elongate tube.

3. The method of claim 1, wherein the predetermined pattern of the conductive adhesive covers 360 degrees of the surface along the non-circular outer perimeter over a width of at least five millimeters along the longitudinal axis.

4. The method of claim 1, wherein expelling the conductive adhesive further comprises applying a bias with a distal end of the dispensing conduit against the surface of the elongate tube such that the distal end of the dispensing conduit remains in contact with the surface of the elongate tube throughout rotation of the elongate tube.

5. The method of claim 1, wherein operating the first motor to rotate the elongate tube further comprises simultaneously contacting the elongate tube with first, second, and third rollers at a location on the elongate tube spaced a first distance from the engagement member, such that the first, second, and third rollers each maintain contact with the elongate tube as they rotate.

6. The method of claim 5, wherein at least one of the first, second, and third rollers is configured to place a bias on the elongate tube.

7. The method of claim 6, wherein the at least one of the first, second, and third rollers is configured to bias the elongate tube against the other of the first, second, and third rollers.

8. The method of claim 1, further comprising:
accelerating or aiding a change in the conductive adhesive from a first, flowable state to a second, substantially solidified state.

9. The method of claim 8, wherein accelerating or aiding the change comprises heating the conductive adhesive.

10. The method of claim 8, wherein accelerating or aiding the change comprises applying ultraviolet (UV) radiation to the conductive adhesive.

11. The method of claim 8, wherein accelerating or aiding the change comprises applying a chemically-based adhesive accelerator.

12. The method of claim 1, further comprising:
sensing the location of at least a portion of the dispensing conduit.

13. The method of claim 12, wherein sensing the location comprises using one or more sensor selected from the list consisting of: an inductive proximity sensor, a magnetic proximity sensor, a capacitive proximity sensor, and a laser micrometer.

14. The method of claim 1, wherein the predetermined pattern of the conductive adhesive is applied to the surface such that the expelled conductive adhesive is caused to be moved away from the dispensing conduit as the elongate tube is rotated by the first motor.

15. The method of claim 1, wherein the dispensing conduit comprises an orifice configured to permit the conductive adhesive to exit therefrom.

16. The method of claim 1, wherein a distal portion of the dispensing conduit comprises an exit location configured to permit the conductive adhesive to exit therefrom.

17. A method for applying a predetermined pattern of material onto an elongate tubular substrate, comprising:
securing a first portion of an elongate tube to an engagement member configured to be rotated by a first motor, such that the elongate tube can be rotated in unison with the engagement member;
operating the first motor to rotate the elongate tube;
operating a second motor to change relative displacement between the elongate tube and a distal portion of a dispensing conduit along a longitudinal axis of the elongate tube;
expelling a conductive adhesive from a fluid dispenser through the dispensing conduit and out through an exit location at the distal portion of the dispensing conduit to form a predetermined pattern of the conductive adhesive on a surface of the elongate tube; and
maintaining the exit location in proximity to the surface of the elongate tube during relative movement between the elongate tube and the exit location by use of a controller while utilizing information from a sensor configured to sense the location of at least a portion of the dispensing conduit.

18. The method of claim 17, wherein the sensor is selected from the list consisting of: an inductive proximity sensor, a magnetic proximity sensor, a capacitive proximity sensor, and a laser micrometer.

19. The method of claim 17, wherein the predetermined pattern of the conductive adhesive is applied to the surface such that the expelled conductive adhesive is caused to be moved away from the exit location as the elongate tube is rotated by the first motor.

20. The method of claim 17, further comprising:
accelerating or aiding a change in the conductive adhesive from a first, flowable state to a second, substantially solidified state.

* * * * *